(12) United States Patent
White

(10) Patent No.: US 12,529,763 B2
(45) Date of Patent: Jan. 20, 2026

(54) METHODS AND APPARATUS FOR PROVIDING A FAULT-TOLERANT LIDAR SENSOR

(71) Applicant: Nuro, Inc., Mountain View, CA (US)

(72) Inventor: Paul Michael White, Mountain View, CA (US)

(73) Assignee: NURO, INC., Mountain View, CA (US)

( * ) Notice: Subject to any disclaimer, the term of this patent is extended or adjusted under 35 U.S.C. 154(b) by 847 days.

(21) Appl. No.: 17/875,264

(22) Filed: Jul. 27, 2022

(65) Prior Publication Data

US 2023/0044157 A1 Feb. 9, 2023

Related U.S. Application Data

(60) Provisional application No. 63/229,407, filed on Aug. 4, 2021.

(51) Int. Cl.
| | |
|---|---|
| G01S 7/48 | (2006.01) |
| G01S 7/481 | (2006.01) |
| G01S 17/931 | (2020.01) |
| H02J 50/10 | (2016.01) |

(52) U.S. Cl.
CPC .......... *G01S 7/4813* (2013.01); *G01S 7/4817* (2013.01); *G01S 17/931* (2020.01); *H02J 50/10* (2016.02)

(58) Field of Classification Search
None
See application file for complete search history.

(56) References Cited

U.S. PATENT DOCUMENTS

| | | | |
|---|---|---|---|
| 11,208,111 B2 | 12/2021 | Chi et al. | |
| 2011/0216304 A1* | 9/2011 | Hall | G01S 17/89 356/4.01 |
| 2021/0394770 A1 | 12/2021 | Rocha et al. | |

* cited by examiner

*Primary Examiner* — Hovhannes Baghdasaryan
(74) *Attorney, Agent, or Firm* — Edell, Shapiro & Finnan, LLC

(57) ABSTRACT

According to one aspect, a lidar system is a lidar system which includes one set of mechanical, e.g., optical, components, and two or more sets of electrical and/or software components. The beams which are provided by the optical components are effectively alternated between a first and second sets of electrical and/or software components. The redundancy provided by the first and second sets of electrical and/or software components allows the lidar system to remain operational in the event that one set of electrical and/or software components becomes non-operational.

10 Claims, 18 Drawing Sheets

METHODS AND APPARATUS FOR PROVIDING A FAULT-TOLERANT LIDAR SENSOR

CROSS REFERENCE TO RELATED APPLICATIONS

This application claims the benefit of Provisional U.S. Application Ser. No. 63/229,407, filed on Aug. 4, 2021, and titled "METHODS AND APPARATUS FOR PROVIDING REDUNDANCY IN A LIDAR SYSTEM"; the aforementioned priority application being hereby incorporated by reference in its entirety.

TECHNICAL FIELD

The disclosure relates to systems provided for use in autonomous vehicles. More particularly, the disclosure relates to providing a lidar system which includes redundancy.

BACKGROUND

As the use of autonomous vehicles increases, the need for sensor systems implemented on autonomous vehicles to be efficient is also increasing. Sensor systems used on autonomous vehicles often include lidar systems. Lidar systems, as for example lidar units which include rotating or spinning lidar sensors, are generally expensive and, as such, providing redundancy associated with the lidar system is generally inefficient as utilizing more than one lidar system may be prohibitive from a cost perspective.

BRIEF DESCRIPTION OF THE DRAWINGS

The disclosure will be readily understood by the following detailed description in conjunction with the accompanying drawings in which.

DESCRIPTION OF EXAMPLE EMBODIMENTS

General Overview

Figure 1:
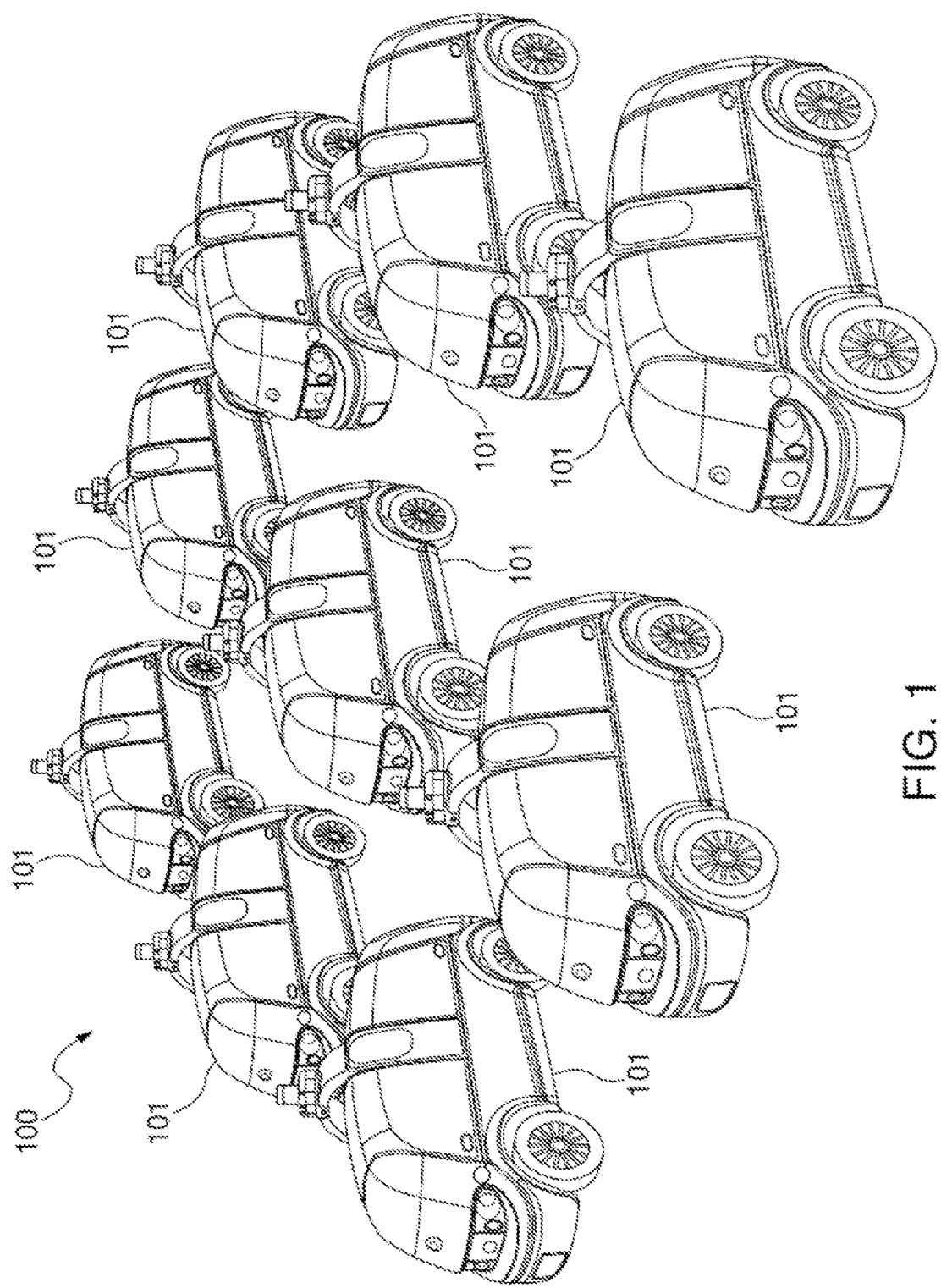
FIG. 1 is a diagrammatic representation of an autonomous vehicle fleet in accordance with an embodiment.

In one embodiment, a lidar system is a rotational lidar system which includes one set of mechanical, e.g., optical, components, and two or more sets of electrical and/or software components. The beams which are provided by the optical components are effectively alternated between primary and secondary sets of electrical and/or software components. The redundancy provided by the primary and secondary sets of electrical and/or software components allows the lidar system to remain operational in the event that one set of electrical and/or software components becomes non-operational.

In another embodiment, a rotational lidar comprises a rotatable housing, a plurality of light sources disposed within the rotatable housing, a plurality of light detectors disposed within the rotatable housing, a dual-winding motor configured to rotate the rotatable housing about an axis, and two motor controllers each configured to control the dual-winding motor. In response to a failure associated with one of the two motor controllers, the LiDAR sensor is configured to continue operating with the other one of the two motor controllers controlling the dual-winding motor to rotate the rotatable housing of the LiDAR about the axis.

In a further embodiment, a lidar comprises a plurality of light sources including a first set of light sources and a second set of light sources, a plurality of light detectors including a first set of light detectors and a second set of light detectors, and circuitry, including (i) a first set of circuitry communicatively coupled to the first set of light sources and the first set of light detectors and (ii) a second set of circuitry communicatively coupled to a second set of light sources and the second set of light detectors. The first set of light sources and the second set of light sources are separately controlled by the first set of circuitry and the second set of circuitry, respectively.

In yet another embodiment, an autonomous vehicle comprises a lidar and one or more computing systems. The lidar is configured to capture point cloud data associated with an environment surrounding the autonomous vehicle. The lidar is configurable to operate in a failsafe mode. The one or more computing systems is configured to receive the point cloud data and generate autonomy commands for controlling the vehicle. The autonomy commands are generated based at least in part on the point cloud data while the autonomous vehicle is operating in an autonomous mode. In response to determining that the lidar is operating in the failsafe mode, the one or more computing systems are configured to perform one or more mitigation steps including imposing one or more autonomy operational constraints for the autonomous vehicle.

Description

Sensor systems used on autonomous vehicles, as for example fully autonomous vehicles and/or semi-autonomous vehicles, typically include lidar units. Rotational or spinning lidar is becoming more and more prevalent in autonomous vehicles. In general, while rotational or spinning lidar provides a full field of view, one drawback of such lidars is that they are generally expensive. As such, the cost associated with rotational or spinning lidar units often renders the use of multiple rotational or spinning lidar units, as for example to provide redundancy in the event of a failure of a lidar unit, to be impractical. Another drawback of such lidars is that they are highly complex with multiple single-points of failure that could render the lidar entirely inoperative. For example, a fault associated with a motor controller for controlling the motor of a lidar may render the lidar inoperative. Similarly, a fault associated with circuitry to control the light emitters of a lidar may similarly render the lidar inoperative. This is especially undesirable in applications such as autonomous vehicles. Furthermore, having a back-up lidar to provide lidar data in the event that a main lidar fails or experiences a fault is impractical. Thus, a lidar sensor or system that may continue to operate when one or more components have faulted is desired.

In particular, the mechanical and optical components of lidars, such as rotational motors, mirrors, lenses, and collimators, may be expensive, heavy, and bulky. In contrast, the electrical and other components (e.g., software, firmware, etc.) of lidars may be inexpensive and compact. By providing a rotational lidar system with one set of mechanical components that provide optics and/or actuation (e.g., motor), but redundant control electronics and/or software, redundancy and fault-tolerance for are effectively provided for a lidar at a relatively low cost and without excessive weight and/or size penalties. In other words, a rotational lidar system with a substantially single mechanical module and two or more electronics and/or software modules provides redundancy and fault-tolerance for the rotational lidar system in an efficient manner. Within such a lidar system, an optics system and an actuator system may essentially be controlled by two or more modules which provide transmitters, receivers, and controllers. As a result, if one module fails or otherwise becomes non-operation, one or more other modules may still allow the lidar system to function.

A rotational lidar system which includes redundant electronic and/or software components may generally be used on autonomous vehicles which are part of a fleet of autonomous vehicles. Referring initially to FIG. 1, an autonomous vehicle fleet will be described in accordance with an embodiment. An autonomous vehicle fleet 100 includes a plurality of autonomous vehicles 101, or robot vehicles. Autonomous vehicles 101 are generally arranged to transport and/or to deliver cargo, items, and/or goods. Autonomous vehicles 101 may be fully autonomous and/or semi-autonomous vehicles. In general, each autonomous vehicle 101 may be a vehicle that is capable of travelling in a controlled manner for a period of time without intervention, e.g., without human intervention. As will be discussed in more detail below, each autonomous vehicle 101 may include a power system, a propulsion or conveyance system, a navigation module, a control system or controller, a communications system, a processor, and a sensor system.

Dispatching of autonomous vehicles 101 in autonomous vehicle fleet 100 may be coordinated by a fleet management module (not shown). The fleet management module may dispatch autonomous vehicles 101 for purposes of transporting, delivering, and/or retrieving goods or services in an unstructured open environment or a closed environment.

Figure 2:
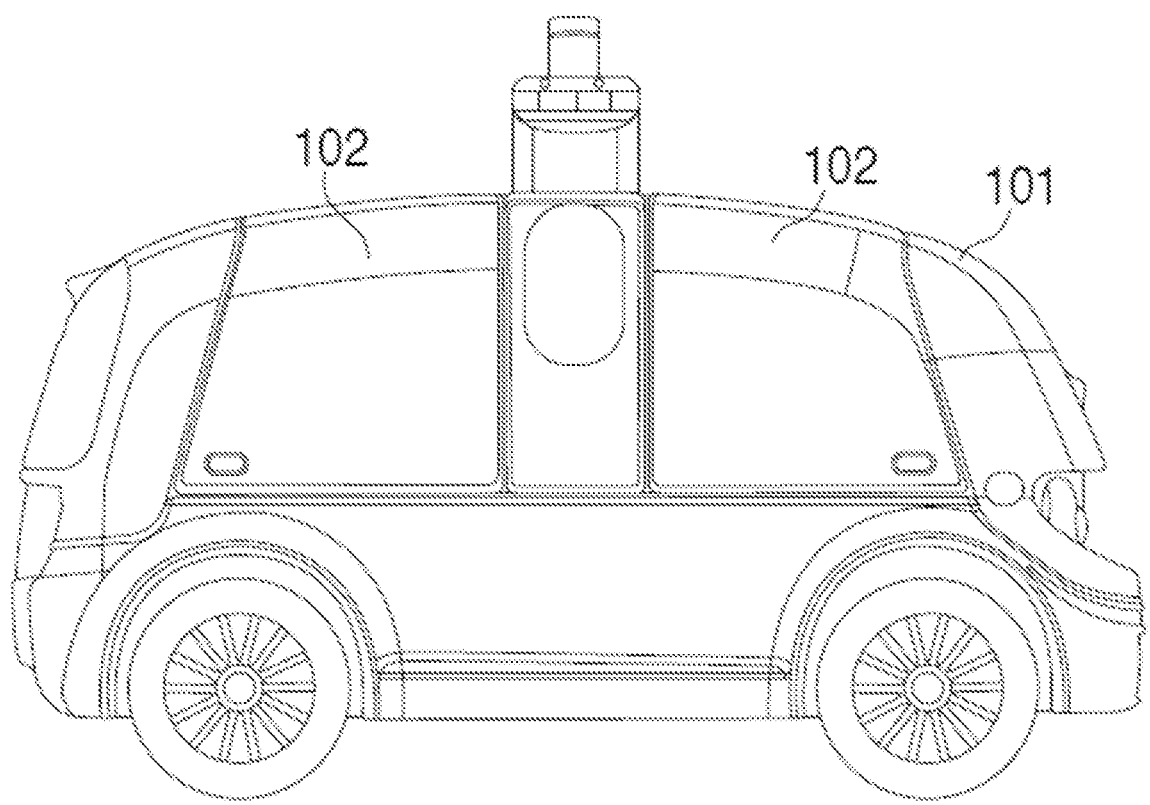
FIG. 2 is a diagrammatic representation of a side of an autonomous vehicle in accordance with an embodiment.

FIG. 2 is a diagrammatic representation of a side of an autonomous vehicle, e.g., one of autonomous vehicles 101 of FIG. 1, in accordance with an embodiment. Autonomous vehicle 101, as shown, is a vehicle configured for land travel. Typically, autonomous vehicle 101 includes physical vehicle components such as a body or a chassis, as well as conveyance mechanisms, e.g., wheels. In one embodiment, autonomous vehicle 101 may be relatively narrow, e.g., approximately two to approximately five feet wide, and may have a relatively low mass and relatively low center of gravity for stability. Autonomous vehicle 101 may be arranged to have a working speed or velocity range of between approximately one and approximately forty-five miles per hour (mph), e.g., approximately twenty-five miles per hour. In some embodiments, autonomous vehicle 101 may have a substantially maximum speed or velocity in range between approximately thirty and approximately ninety mph.

Autonomous vehicle 101 includes a plurality of compartments 102. Compartments 102 may be assigned to one or more entities, such as one or more customer, retailers, and/or vendors. Compartments 102 are generally arranged to contain cargo, items, and/or goods. Typically, compartments 102 may be secure compartments. It should be appreciated that the number of compartments 102 may vary. That is, although two compartments 102 are shown, autonomous vehicle 101 is not limited to including two compartments 102.

Figure 3:
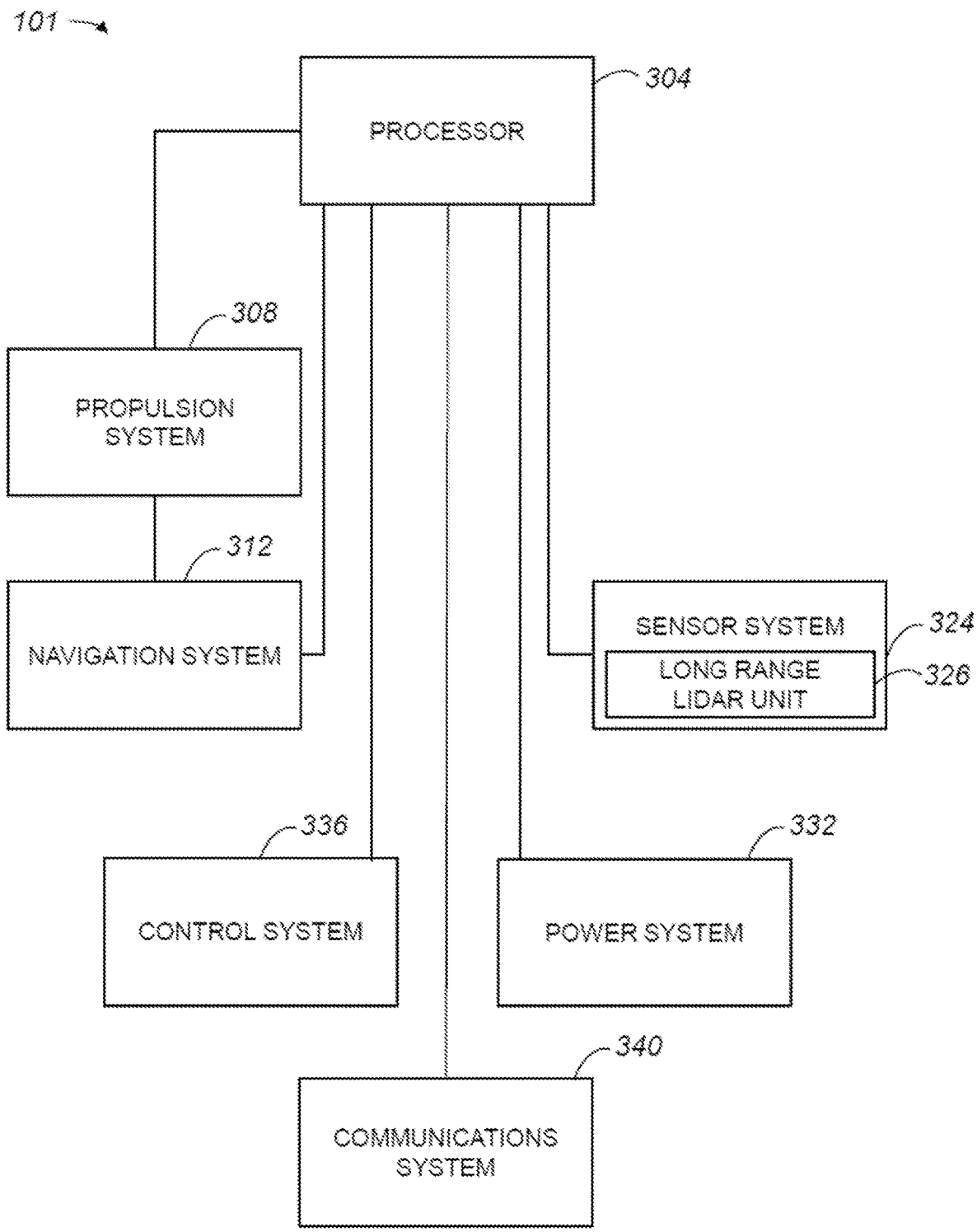
FIG. 3 is a block diagram representation of an autonomous vehicle in accordance with an embodiment.

FIG. 3 is a block diagram representation of an autonomous vehicle, e.g., autonomous vehicle 101 of FIG. 1, in accordance with an embodiment. An autonomous vehicle 101 includes a processor 304, a propulsion system 308, a navigation system 312, a sensor system 324, a power system 332, a control system 336, and a communications system 340. It should be appreciated that processor 304, propulsion system 308, navigation system 312, sensor system 324, power system 332, and communications system 340 are all coupled to a chassis or body of autonomous vehicle 101.

Processor 304 is arranged to send instructions to and to receive instructions from or for various components such as propulsion system 308, navigation system 312, sensor system 324, power system 332, and control system 336. Propulsion system 308, or a conveyance system, is arranged to cause autonomous vehicle 101 to move, e.g., drive. For example, when autonomous vehicle 101 is configured with a multi-wheeled automotive configuration as well as steering, braking systems and an engine, propulsion system 308 may be arranged to cause the engine, wheels, steering, and braking systems to cooperate to drive. In general, propulsion system 308 may be configured as a drive system with a propulsion engine, wheels, treads, wings, rotors, blowers, rockets, propellers, brakes, etc. The propulsion engine may be a gas engine, a turbine engine, an electric motor, and/or a hybrid gas and electric engine.

Navigation system 312 may control propulsion system 308 to navigate autonomous vehicle 101 through paths and/or within unstructured open or closed environments.

Navigation system 312 may include at least one of digital maps, street view photographs, and a global positioning system (GPS) point. Maps, for example, may be utilized in cooperation with sensors included in sensor system 324 to allow navigation system 312 to cause autonomous vehicle 101 to navigate through an environment.

Sensor system 324 includes any sensors, as for example LiDAR, radar, ultrasonic sensors, microphones, altimeters, and/or cameras. Sensor system 324 generally includes onboard sensors which allow autonomous vehicle 101 to safely navigate, and to ascertain when there are objects near autonomous vehicle 101. In one embodiment, sensor system 324 may include propulsion systems sensors that monitor drive mechanism performance, drive train performance, and/or power system levels. Data collected by sensor system 324 may be used by a perception system associated with navigation system 312 to determine or to otherwise understand an environment around autonomous vehicle 101.

In the described embodiment, sensor system 324 includes a long range lidar unit 326 that includes redundancy. Long range lidar unit 326 may be a rotating or spinning lidar unit, and may include a substantially single set of optics, a substantially single actuator, and two or more electronics and/or software modules. Long range lidar unit 326 will be discussed below with reference to FIG. 4.

Power system 332 is arranged to provide power to autonomous vehicle 101. Power may be provided as electrical power, gas power, or any other suitable power, e.g., solar power or battery power. In one embodiment, power system 332 may include a main power source, and an auxiliary power source that may serve to power various components of autonomous vehicle 101 and/or to generally provide power to autonomous vehicle 101 when the main power source does not have the capacity to provide sufficient power.

Communications system 340 allows autonomous vehicle 101 to communicate, as for example, wirelessly, with a fleet management system (not shown) that allows autonomous vehicle 101 to be controlled remotely. Communications system 340 generally obtains or receives data, stores the data, and transmits or provides the data to a fleet management system and/or to autonomous vehicles 101 within a fleet 100. The data may include, but is not limited to including, information relating to scheduled requests or orders, information relating to on-demand requests or orders, and/or information relating to a need for autonomous vehicle 101 to reposition itself, e.g., in response to an anticipated demand.

In some embodiments, control system 336 may cooperate with processor 304 to determine where autonomous vehicle 101 may safely travel, and to determine the presence of objects in a vicinity around autonomous vehicle 101 based on data, e.g., results, from sensor system 324. In other words, control system 336 may cooperate with processor 304 to effectively determine what autonomous vehicle 101 may do within its immediate surroundings. Control system 336 in cooperation with processor 304 may essentially control power system 332 and navigation system 312 as part of driving or conveying autonomous vehicle 101. Additionally, control system 336 may cooperate with processor 304 and communications system 340 to provide data to or obtain data from other autonomous vehicles 101, a management server, a global positioning server (GPS), a personal computer, a teleoperations system, a smartphone, or any computing device via the communication module 340. In general, control system 336 may cooperate at least with processor 304, propulsion system 308, navigation system 312, sensor system 324, and power system 332 to allow vehicle 101 to operate autonomously. That is, autonomous vehicle 101 is able to operate autonomously through the use of an autonomy system that effectively includes, at least in part, functionality provided by propulsion system 308, navigation system 312, sensor system 324, power system 332, and control system 336. Components of propulsion system 308, navigation system 312, sensor system 324, power system 332, and control system 336 may effectively form a perception system that may create a model of the environment around autonomous vehicle 101 to facilitate autonomous or semi-autonomous driving.

As will be appreciated by those skilled in the art, when autonomous vehicle 101 operates autonomously, vehicle 101 may generally operate, e.g., drive, under the control of an autonomy system. That is, when autonomous vehicle 101 is in an autonomous mode, autonomous vehicle 101 is able to generally operate without a driver or a remote operator controlling autonomous vehicle. In one embodiment, autonomous vehicle 101 may operate in a semi-autonomous mode or a fully autonomous mode. When autonomous vehicle 101 operates in a semi-autonomous mode, autonomous vehicle 101 may operate autonomously at times and may operate under the control of a driver or a remote operator at other times. When autonomous vehicle 101 operates in a fully autonomous mode, autonomous vehicle 101 typically operates substantially only under the control of an autonomy system. The ability of an autonomous system to collect information and extract relevant knowledge from the environment provides autonomous vehicle 101 with perception capabilities. For example, data or information obtained from sensor system 324 may be processed such that the environment around autonomous vehicle 101 may effectively be perceived.

Figure 4:
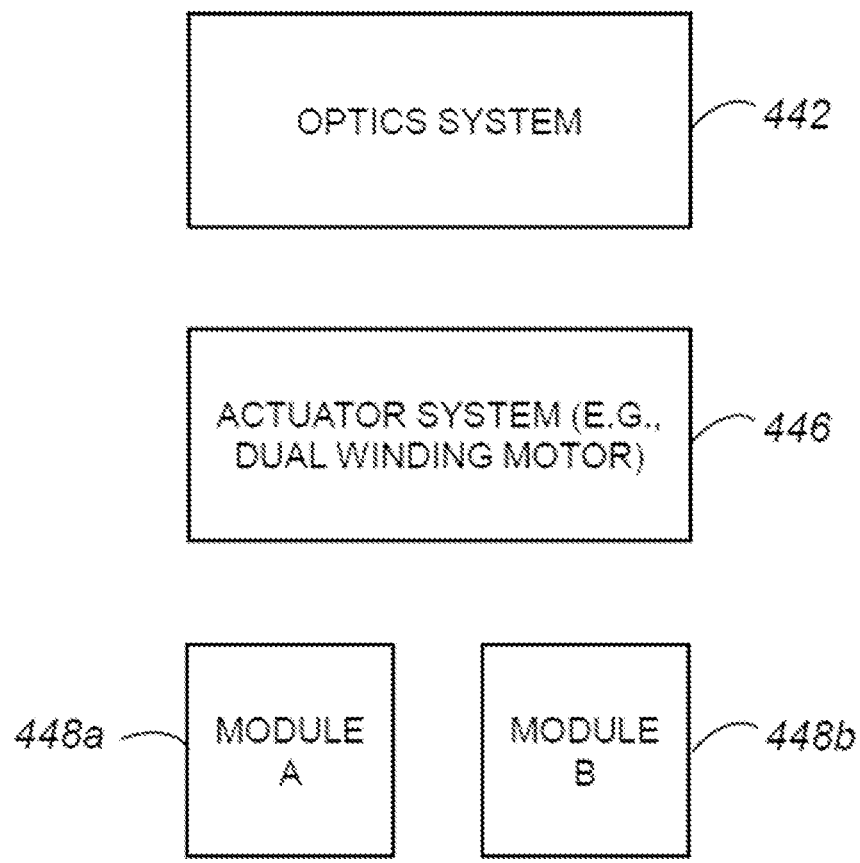
FIG. 4 is a block diagram representation of a long range lidar unit with redundancy, e.g., long range lidar unit 326 of FIG. 3, in accordance with an embodiment.

With reference to FIG. 4, long range lidar unit 326 will be described in accordance with an embodiment. Long range lidar unit 326 incudes an optics system 442, an actuator system 446, and modules 448a, 448b. In the described embodiment, long range lidar unit 326 is a rotational or spinning lidar.

Optics system 442 generally includes laser optics, or optics associated with creating light beams, and a mechanical arrangement which cooperates with actuator system 446 to provide rotation that allows the laser optics to effectively create an approximately 360 degree field of view. Actuator system 446 may be any suitable actuator that enables light beams such as laser beams to substantially cover an approximately 360 degree field of view. By way of example, actuator system 446 may be, but is not limited to being, a dual winding motor. Modules 448a, 448b are generally configured to provide electronics and/or software logic that facilitates the operation of optics system 442 and actuator system 446. It should be appreciated that although two modules 448a, 448b are shown, the number of modules 448a, 448b may vary widely, e.g., long range lidar unit 326 may include more than two modules 448a, 448b.

Modules 448a, 448b may generally be powered by separate power sources or supplies (not shown) which may both be arranged to provide power to optics system 442 and/or to actuator system 446. It should be appreciated that optics system 442 and actuator system 446 may instead be provided with power from a dedicated source.

Figure 5A:
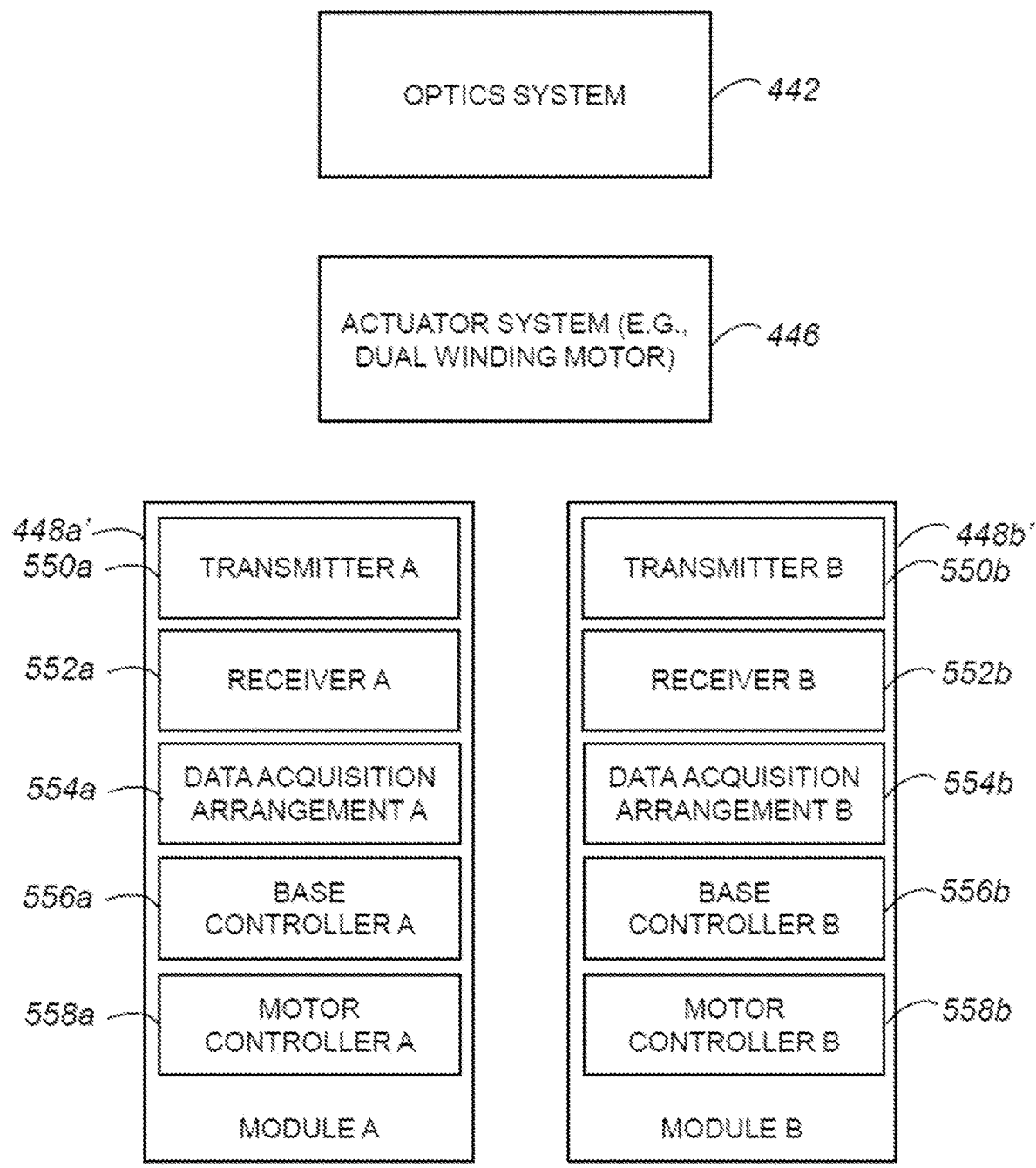
FIG. 5A is a block diagram representation of a long range lidar unit, e.g., long range lidar unit 326 of FIGS. 3 and 4, which includes redundant modules with transmitters, receivers, data acquisition arrangements, and controller in accordance with an embodiment.

Referring next to FIG. 5A, the components included in modules 448a, 448b will be described in accordance with an embodiment. Long range lidar unit 326' incudes optics system 442, actuator system 446, module A 448a', and module B 448b'. Module A 448a' and module B 448b' may generally be the same, e.g., may include substantially the same components, although it should be appreciated that module A 448a' and module B 448b' are not limited to including substantially the same components.

Module A 448a' may include a transmitter 550a, a receiver 552a, a data acquisition arrangement 554a, a base controller 556a, and a motor controller 558b. Transmitter 550a is configured to cooperate with optics system 442 and actuator system 446 to effectively emit a light beam from long range lidar unit 326'. Receiver 552a is configured to effectively receive or obtain a reflected light beam, as for example a light beam reflected back to long range lidar unit 326' after being transmitted by transmitter 550a. Data acquisition arrangement (DAQ) 554a includes hardware configured to effectively process, e.g., to measure, signals or beams obtained by receiver 552a. Base controller 556a is configured to control transmitter 550a, receiver 552a, and DAQ 554a, while motor controller 558a is configured to control actuator system 446.

Module B 448b' may include a transmitter 550b, a receiver 552b, a data acquisition arrangement 554b, a base controller 556b, and a motor controller 558b. Transmitter 550b is configured to cooperate with optics system 442 and actuator system 446 to effectively emit a light beam from long range lidar unit 326'. Receiver 552b is configured to effectively receive or obtain a reflected light beam, as for example a light beam reflected back to long range lidar unit 326' after being transmitted by transmitter 550b. DAQ 554b includes hardware configured to effectively process, e.g., to measure, signals or beams obtained by receiver 552b. Base controller 556b is configured to control transmitter 550b, receiver 552b, and DAQ 554b, while motor controller 558b is configured to control actuator system 446.

Figure 5B:
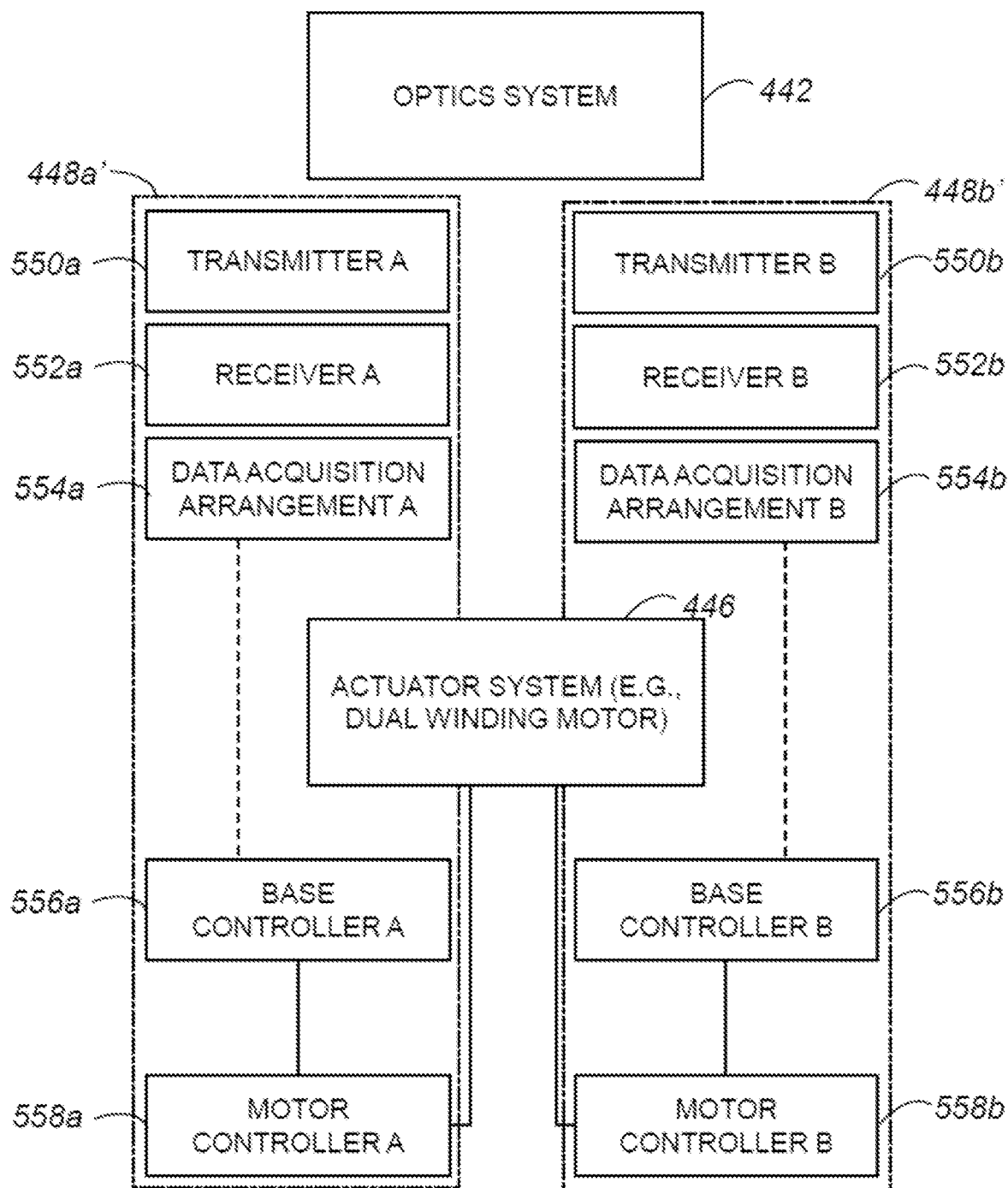
FIG. 5B is a block diagram representation of a long range lidar unit, e.g., long range lidar unit 326' of FIG. 5A, which indicates connections between components in accordance with an embodiment.

FIG. 5B is a block diagram representation of long range lidar unit 326' which depicts connections between components in accordance with an embodiment. Long range lidar unit 326" incudes modules 448a', 448b' which are configured to operate substantially in parallel. As shown, within module A 448a', base controller 556a communicates with DAQ 554a, e.g., through a slip ring arrangement. Motor controller 558a is in communication with base controller 556a, and also in communication with actuator system 446. The communications between motor controller 558a and base controller 556a, and the communications between motor controller 538a and actuator system 446, may include wired and/or wireless communications.

Base controller 556b of module B 448b' communicates with DAQ 554b, e.g., through a slip ring arrangement. Motor controller 558b is in communication with base controller 556b, and also in communication with actuator system 446. The communications between motor controller 558b and base controller 556b, and the communications between motor controller 538b and actuator system 446, may include wired and/or wireless communications.

In general, module A 448a' and module B 448b' may be configured such that each module 448a', 448b' is configured to transmit, receive, and process a set of beams associated with optics system 442. By way of example, if long range lidar unit 326" provides approximately sixty-four beams or signals, each module 448a', 448b' may effectively control and process approximately thirty-two beams or signals. Essentially splitting control or responsibility for beams generated by optics system 442, module A 448a' provides redundancy for module B 448b', and vice versa. In the event that one module 448a', 448b' becomes non-operational, long range lidar unit 326" may continue to operate using approximately half of the beams or signals which may be generated by optics system 442.

Figure 6A:
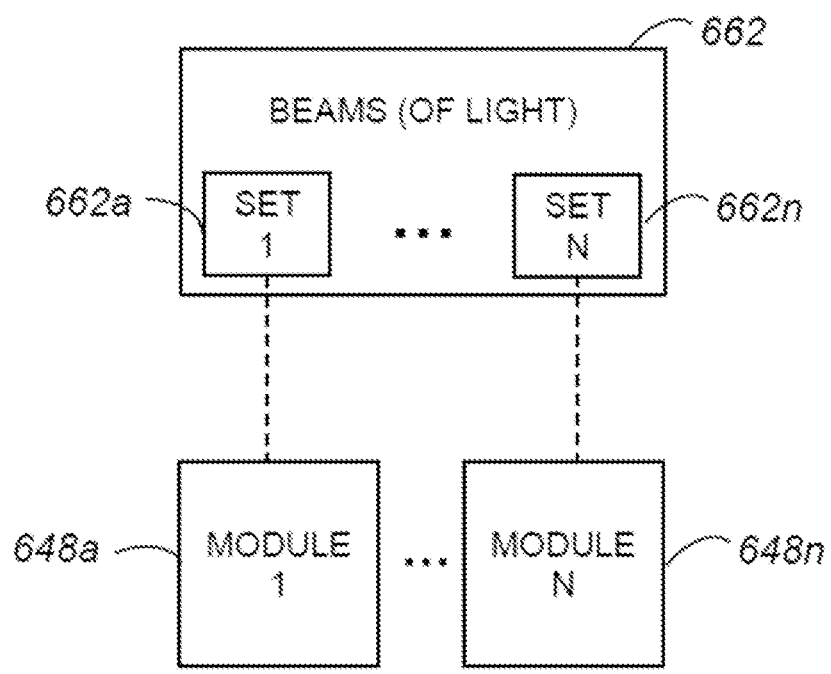
FIG. 6A is a block diagram representation to a long range lidar unit with redundancy which includes sets of beams associated with modules in accordance with an embodiment.

FIG. 6A is a block diagram representation to a long range lidar unit with redundancy which includes sets of beams associated with modules in accordance with an embodiment. A long range lidar unit with redundancy 626 is configured to generate a set of beams 662, e.g., beams of light or laser beams, and includes more than one module 648a-n which provides electronics and/or software used by long range lidar unit 626 In one embodiment, beams 662 include approximately sixty-four beams. It should be appreciated, however, that the number of beams 662 may vary widely and is not limited to sixty-four. In one embodiment, long range lidar unit 626 is a rotational lidar unit.

Beams 662 may be divided into two or more sets 662a-n. The number of sets may depend upon factors including, but not limited to including, how many modules 648a-n are included in long range lidar unit 626. In general, sets 662a-n may include approximately the same number of beams 662. For example, if modules 628a-n include two modules, two sets 662a-n may each include approximately half of beams 662. Similarly, if modules 628a-n include three modules, three sets 662a-n may each include approximately a third of beams 662. It should be appreciated that while each set 662a-n may generally include the same number of beams 662, the number of beams 662 in each set 662a-n is not limited to being approximately the same.

Long range lidar unit 626 or a rotational lidar system has one overall set of optics which are controlled using redundant control electronics and/or software associated with modules 628a-n. In one embodiment, module 648a may be a first or primary module, and module 648n may be a second or secondary module. Beams 662 may be divided such that beams are alternated between set 662a which is associated with module 648a and set 662n which is associated with module 648n. Effectively alternating beams 662 in sets 662a-n controlled by modules 648a-n, respectively, may allow a substantially full vertical field of view associated with each set 662a-n with approximately half of the overall vertical resolution. That is, when long range lidar unit 626 includes two modules 648a-n, each set 662a-n may be associated with a full vertical field of view at approximately half of the vertical resolution that would be provided by both sets 662a-n together.

Figure 6B:
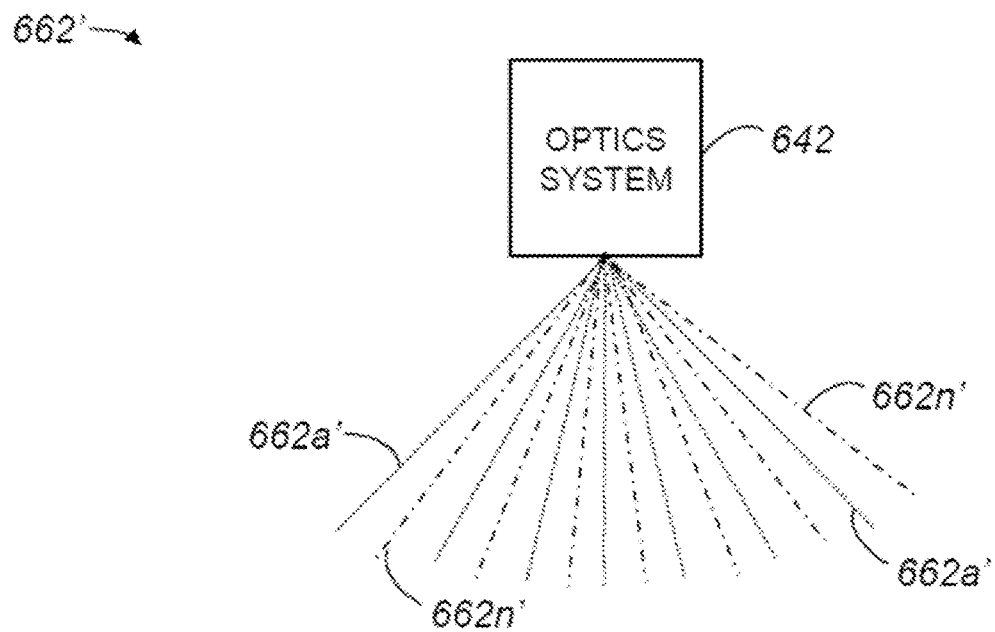
FIG. 6B is a diagrammatic representation of sets of beams, e.g., sets of beams 662*a-n* of FIG. 6A, in accordance with an embodiment.
Figure 6B:
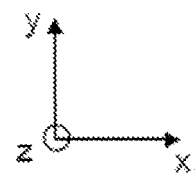

With reference to FIG. 6B, alternating beams 662 in sets 662a-n will be described in accordance with an embodiment. In the embodiment as shown, beams 662 associated with long range lidar unit 626 are divided into two sets of beams 662a', 662n', although it should be appreciated that the number of sets is not limited to two. Sets of beams 662a', 662n' are generated by an optics system 642 included in long range lidar unit 626'. Sets of beams 662a', 662n' are such that every other beam is associated with a different set of beams 662a', 662n'. That is, beams in sets 662a', 662n' alternate such that each beam from set 662a' is adjacent to a beam from set 662n', and vice versa.

When a long range lidar unit with redundancy includes an electronics and/or software module which fails or otherwise becomes non-operational, the remaining one or more electronics and/or software modules may continue to function. As such, the long range lidar unit may continue to operate. However, it may be determined whether the operation of the compromised long range lidar unit meets operational standards. That is, when a long range lidar unit with redundancy includes a set of electronics and/or software which is no longer operating at a threshold level, an assessment may be made to ascertain whether the long range lidar unit may continue to be used.

Figure 7:
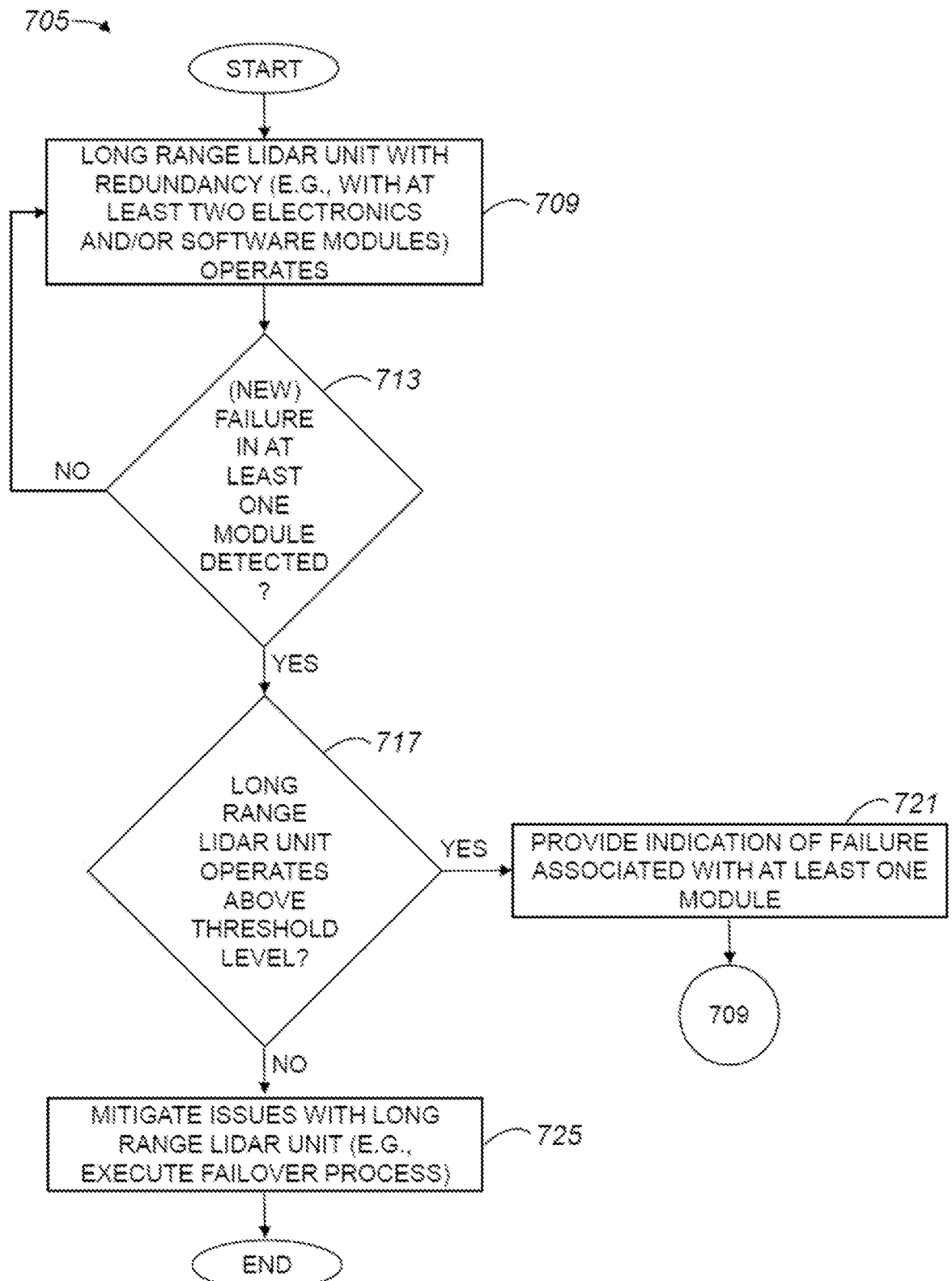
FIG. 7 is a process flow diagram which illustrates a method of using a long range lidar unit with redundancy in accordance with an embodiment.

FIG. 7 is a process flow diagram which illustrates a method of using a long range lidar unit with redundancy in accordance with an embodiment. A method 705 of using a long range lidar unit with redundancy begins at a step 709 in which a long range lidar unit with redundancy operates. The operation of the long range lidar unit with redundancy may generally involve at least two electronics and/or software modules operating as expected. In one embodiment, the long range lidar unit with redundancy is mounted on a vehicle such as an autonomous or semi-autonomous vehicle.

In a step 713, it is determined whether a failure has been detected in at least one electronics and/or software module of the long range lidar unit with redundancy. That is, it is determined whether there is a new failure detected in at least one module of the long range lidar unit with redundancy. The failure may be, but is not limited to being, an inability for at least one module to function and/or an inability for at least one module to function at or higher than a threshold level. If the determination is that a failure has not been detected, then process flow returns t step 709 in which the long range lidar unit with redundancy continues to operate.

Alternatively, if it is determined in step 713 that a failure in at least one module is detected, the indication is that the long range lidar unit with redundancy is to be assessed to determine whether the long range lidar unit with redundancy is effectively fit for operation or use. As such, in a step 717, it is determined whether the lidar unit with redundancy is capable of operating above a threshold level, or a level at which the lidar unit is considered to be able to meet operational specifications, e.g., approximately minimal operational specifications. For example, such a determination may be based on whether there is a sufficient number of beams associated with the one or more functional electronic and/or software modules to render the information collected by the long range lidar unit with redundancy to be substantially accurate. Such a determination may also be based on how many electronics and/or software modules remain operational.

If the determination in step 717 is that the long range lidar unit with redundancy is operating above a threshold level, then in a step 721, an indication of the failure of at least one electronics and/or software module is provided, as for example to a fleet management system or to a database associated with a vehicle on which the long range lidar unit with redundancy is mounted. Once the indication of failure is provided, process flow returns to step 709 in which the long range lidar unit with redundancy continues to operate. The operation of the long range lidar unit with redundancy is such that at least one electronic and/or software module is no longer operational.

Returning to step 717, if the determination is that the long range lidar unit with redundancy is no longer operating above a threshold level, then in a step 725, issues associated with the long range lidar unit with redundancy are mitigated. Mitigation may include, but is not limited to including, executing a failover process such as a failover process in which the vehicle on which the long range lidar unit with redundancy is mounted is brought to a stop at a safe location either autonomously or under the control of a remote operator. After mitigation occurs, the method of using a long range lidar unit with redundancy is completed.

Figure 8:
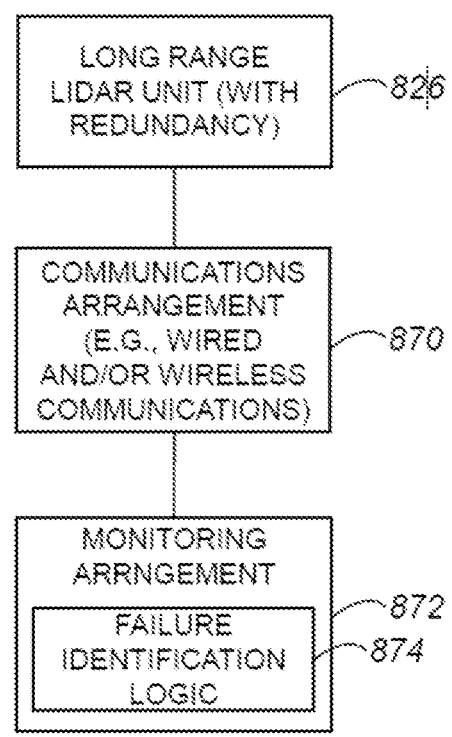
FIG. 8 is a block diagram representation of a system which enables a determination to be made as to whether a long range lidar unit with redundancy is operational in accordance with an embodiment.

FIG. 8 is a block diagram representation of a system which enables a determination to be made as to whether a long range lidar unit with redundancy is operational in accordance with an embodiment. A system 868 includes a long range lidar unit with redundancy 826, a communications arrangement 870, and a monitoring arrangement 872. Monitoring arrangement 872 is configured to monitor the performance of long range lidar unit 826. In one embodiment, monitoring arrangement 872 and long range lidar unit 826 communicate using communications arrangement 870. Communications arrangement 870 may support wired and/or wireless communications. Monitoring arrangement 872 may be remote with respect to long range lidar unit 826.

Monitoring arrangement 872 includes failure identification logic that is configured to determine whether there may be failures or other issues with long range lidar unit 826. In one embodiment, failure identification logic 874 is arranged to determine whether one or more electronics and/or software modules of long range lidar unit 826 is no longer operational.

Figure 9:
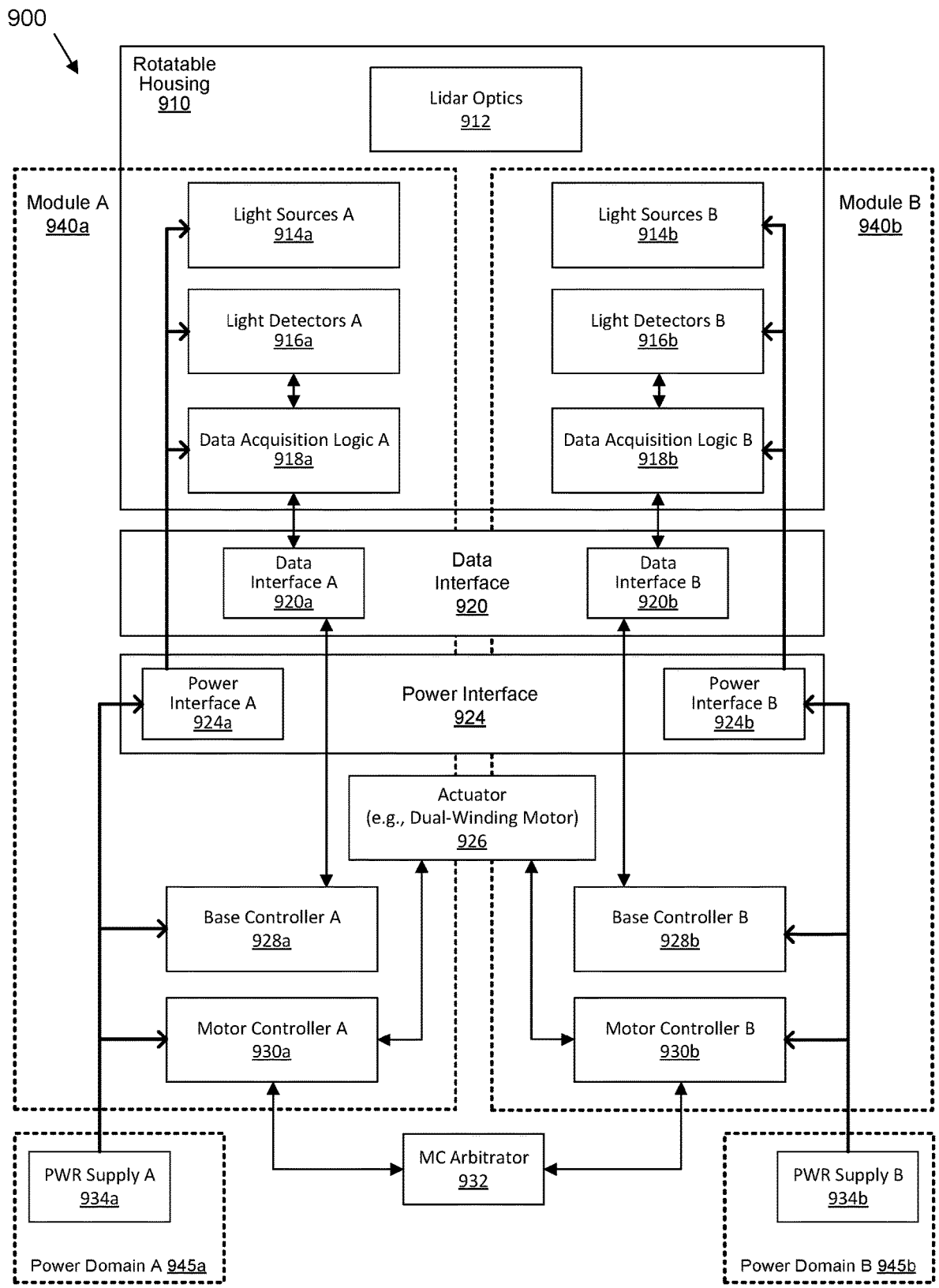
FIG. 9 is a block diagram representation of another example of a fault-tolerant lidar, in accordance with embodiments.

FIG. 9 is a block diagram representation of another example of a fault-tolerant lidar, in accordance with embodiments. According to embodiments, the fault-tolerant lidar 900 is configured with two sets of electronic and/or software components that provide redundancy and fault-tolerance. In this manner, when one set of electronic and/or software components fails or experiences a fault, the other set of electronic and/or software components may continue to operate the fault-tolerant lidar 900 to provide point cloud data. In particular, at least some of the electronic and/or software components of the fault-tolerant lidar 900 may be arranged into two or more modules: a first module 940a and a second module 940b. In the event that one or more components in the first module 940a fails, components of second module 940b may continue operating and the fault-tolerant lidar 900 may continue to provide point cloud data, and vice versa.

According to embodiments, while the fault-tolerant lidar 900 effectively operates using only components of the first module 940a or using only components of the second module 940b, the fault-tolerant lidar 900 may be described as operating in a failsafe mode. In the failsafe mode, the performance of the lidar 900 may be reduced but the lidar 900 may continue operating to provide point cloud data associated with the environment being measured or detected by the lidar 900. In particular, a vertical field of view of the lidar 900 may effectively remain substantially the same but the angular resolution or the number of beams emitted and measured by the lidar 900 may be reduced. The lidar 900 may generate status signals to inform the autonomous vehicle on which the lidar 900 is installed that it is operating in the failsafe mode. Alternatively, systems of the autonomous vehicle may monitor and/or analyze point cloud data generated by the fault-tolerant lidar 900 to determine that the fault-tolerant lidar 900 has entered failsafe mode operations.

As illustrated in FIG. 9, the example fault-tolerant lidar 900 may include a rotatable housing 910, a data interface 920, a power interface 924, an actuator 926, two or more base controllers 928a and 928b, two or more motor controllers 930a and 930b, and a motor controller arbitrator 932. Furthermore, the rotatable housing 910 may have a plurality of components disposed therewithin such as lidar optics 912, light sources 914a and 914b, light detectors 916a and 916b, and data acquisition logic 918a and 918b.

According to embodiments, the fault-tolerant lidar 900 may be powered (e.g., receive power) from two separate power supplies 934a and 934b and/or two separate power domains. The power supplies 934a and 934b may be low-voltage power distribution units (LVPDUs) of an autonomous vehicle and may supply direct current (DC) power in the range of 3 to 40 volts (e.g., 12 volts). Generally, power supply 934a may provide power to components within Module A 940a and power supply 934b may provide power to components within Module B 940b. The power supplies 934a and 934b may be configured to be in separate power domains 945a and 945b, respectively, of the autonomous vehicle. That is, the power domain 945a that includes the power supply 934a may be electrically insulated from the power domain 945b that includes the power supply 934b. Although the first and second power domains may both be powered using a common high-voltage power source (e.g., a high-voltage battery) of the autonomous vehicle, the first and second power domains of the autonomous vehicle may be configured such that failures in power supply components such as LVPDUs and DC-DC converters within one power domain does not affect the provision of electrical power within the other power domain. By configuring the fault-redundant lidar 900 to receive power from two separate power domains in the manner described in this disclosure, the fault-tolerant lidar 900 may be able to operate even when one of the power domains 945a or 945b fails. For instance, if the power supply 934a (e.g., an LVPDU) or another component (e.g., a DC-DC converter) within the power domain 945a fails, the components of Module B, which receives power from power supply 934b and power domain 945b, may continue to operate. And fault-tolerant lidar 900 may continue to provide lidar point cloud data (e.g., in a fail-safe mode). Additional details regarding the operation of the fault-tolerant lidar 900 in the event of a power supply failure and/or a power domain failure is illustrated in and described with respect to FIGS. 11A-E The actuator 926 may be mechanically coupled to the rotatable housing 910 and configured to rotate, pivot, turn, or spin the rotatable housing 910 about a rotation axis. The actuator 926 may be configured to receive control signals from two separate motor controllers 928a and 928b. In the event that motor controller 928a fails or experiences a fault, the actuator 926 may continue to operate under the control of motor controller 930b to rotate, pivot, turn, or spin the rotatable housing 910 about the rotation axis, and vice versa. In addition, the actuator 926 may be configurable to receive power from either one of and/or both of the power supplies 934a or 934b. The actuator 926 may be a dual-winding motor in which a first set of windings on the dual-winding motor is electrically coupled to be energized by power supplied from the power domain 945a by power supply 934a while a second set of windings on the dual-winding motor is electrically coupled to be energized by power supplied from the power domain 945b by power supply 934b. In the event of a failure of the power supply 934a (or a broader failure of power domain 945a), the actuator 926 may continue to receive power from the power supply 934b to rotate the rotatable housing 910 about the rotation axis, and vice versa.

The data interface 920 may function as a data exchange interface between components disposed within the rotatable housing 910 and components of the lidar not disposed within the rotatable housing 910. In particular, the data interface 920 may enable two-way data communication between components of the lidar 900 that are disposed within the rotatable housing 910 and components of the lidar that are within the base of the lidar 900 (i.e., components of the lidar that are not disposed within the rotatable housing 910). Furthermore, the data interface 920 may comprise two separate interfaces 920a and 920b. The first data interface 920a may be configured to transfer data between components of the first module 940a that are within the base of the lidar 900 (e.g., base controller 928a, etc.) and components of the first module 940a that are disposed within the rotatable housing 910 (e.g., the first set of light sources 914a, the first set of light detectors 916a, and data acquisition logic 918a, etc.). For example, data from the data acquisition logic 918a may be transferred to the base controller 928a via the data interface 920a. As another example, the control signals to control the first set of light sources 914a may be transferred from the base controller 928a to the first set of light sources 914a via the first data interface 920a. Similarly, the second data interface 920b may be configured to transfer data between components of the second module 940b that are within base of the lidar 900 (e.g., base controller 928b, etc.) and components of the second module 940b that are disposed within the rotatable housing 910 (e.g., the second set of light sources 914b, the second set of light detectors 916b, and data acquisition logic 918b, etc.). For example, data from the data acquisition logic 918b may be transferred to the base controller 928b via the data interface 920b. As another example, the control signals to control the second set of light sources 914b may be transferred from the base controller 928b to the second set of light sources 914b via the second data interface 920b.

In certain embodiments, the first and second data interfaces 920a and 920b may be optical data interfaces (e.g., light pipes). For example, the first data interface 920a and second data interface 920b may be concentric light pipes. And there may be an air gap between the rotatable housing side of the data interface 920 and the non-rotatable housing side of the data interface 920. In particular, the first data interface 920a may be a light pipe with an airgap data transfer interface and the second data interface 920 may be a ring-shaped light pipe with an airgap data transfer interface that is concentric to the first data interface 920, or vice versa.

The power interface 924 may convey power to components within the rotatable housing 910. For example, the power interface 524 may convey power to light sources 914a and 914b, the light detectors 916a and 916b, and the data acquisition logic 918a and 918b. The power interface 924 may include two interfaces 924a and 924b. The first power interface 924a may convey power from the first power supply 934a (which draws power from the first power domain 945a) to the components of the first module 940a that are disposed within the rotatable housing 910 such as the first set of light sources 914a, the first set of light detectors 916a, and the first data acquisition logic 918a. The second power interface may convey power from the second power supply 934b (which draws power from the second power domain 945b) to the components of the second module 940b that are disposed within the rotatable housing 910 such as the second set of light sources 914b, the second set of light detectors 916b, and the second data acquisition logic 918b. The power interfaces 924a and 924b may each comprise a wireless power transfer mechanism such as an inductive coil arrangement. To accommodate both power interfaces 924a and 924b within the interface 922 between the base of the lidar 900 and the rotatable housing 910, the power interfaces 924a and 924b may be arranged as concentric inductive coils having different radii. For instance, the first power interface 924a may be a first inductive coil having a smaller radius than a second inductive coil that corresponds to second power interface 924b and the two inductive coils may be arranged concentrically. In other embodiments, the power interfaces 924a and 924b each be configured as a slip ring power transfer arrangement.

According to embodiments, components from the first module 940a may be manufactured, provisioned, configured, or arranged on the same printed circuit board (PCB) as components from the second module 940b. In particular, the circuitry associated with the first base controller 928a may be provisioned on the same PCB as circuitry associated with the second base controller 928b. Similarly, circuitry associated with the first motor controller 930a may be provisioned on the same PCB as circuitry associated with the second motor controller 930b. This may advantageously conserve space and weight, thereby further reducing or even eliminating space and weight penalties associated with having redundant components within the lidar 900 to improve fault-tolerance. In other words, by provisioning components from the first module 940a and the second module 940b on the same PCB, the size and weight of the fault-tolerance lidar 900 may be on par or comparable with a conventional lidar having the same specifications and/or performance.

Although FIG. 9 illustrates two modules, the first module 940a and the second module 940b, it should be understood that the lidar 900 illustrated in FIG. 9 is not limited to having two modules. Furthermore, although FIG. 9 illustrates two power domains 945a and 945b and two power supplies 934a and 934b providing power to the lidar 900, it should be appreciated that the lidar 900 illustrated in FIG. 9 is not limited to being powered by two power domains. In particular, any number of modules, sets of circuitry, sets of light sources and light detectors, and power domains may be used to provide redundancy and fault-tolerance to the lidar 900 of FIG. 9 without departing from the scope and spirit of this disclosure.

Figure 10A:
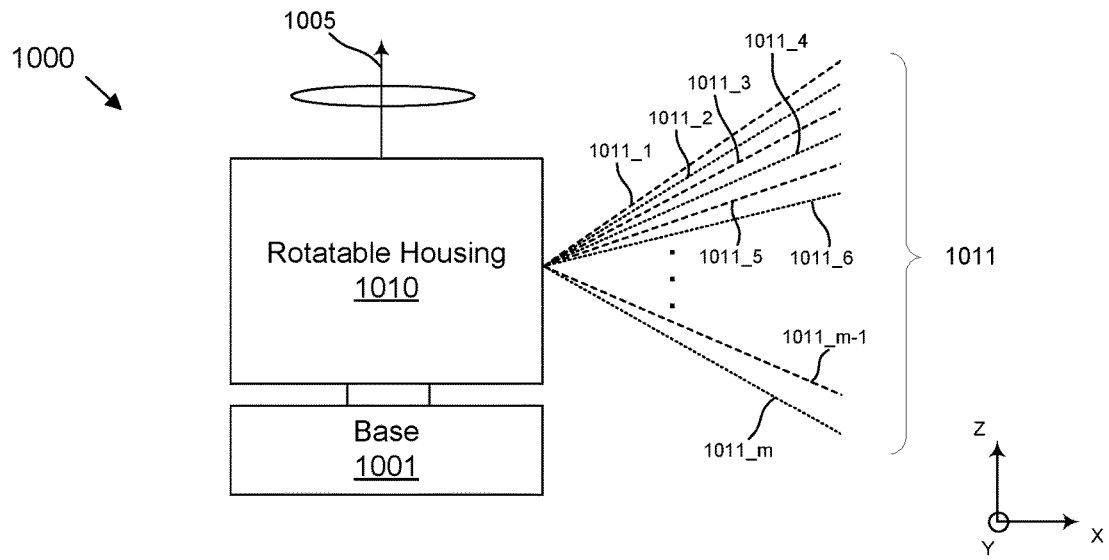
FIGS. 10A-B are block diagrams illustrating an example fault-tolerant lidar which includes light beams generated by the lidar, in accordance with embodiments.
Figure 10B:
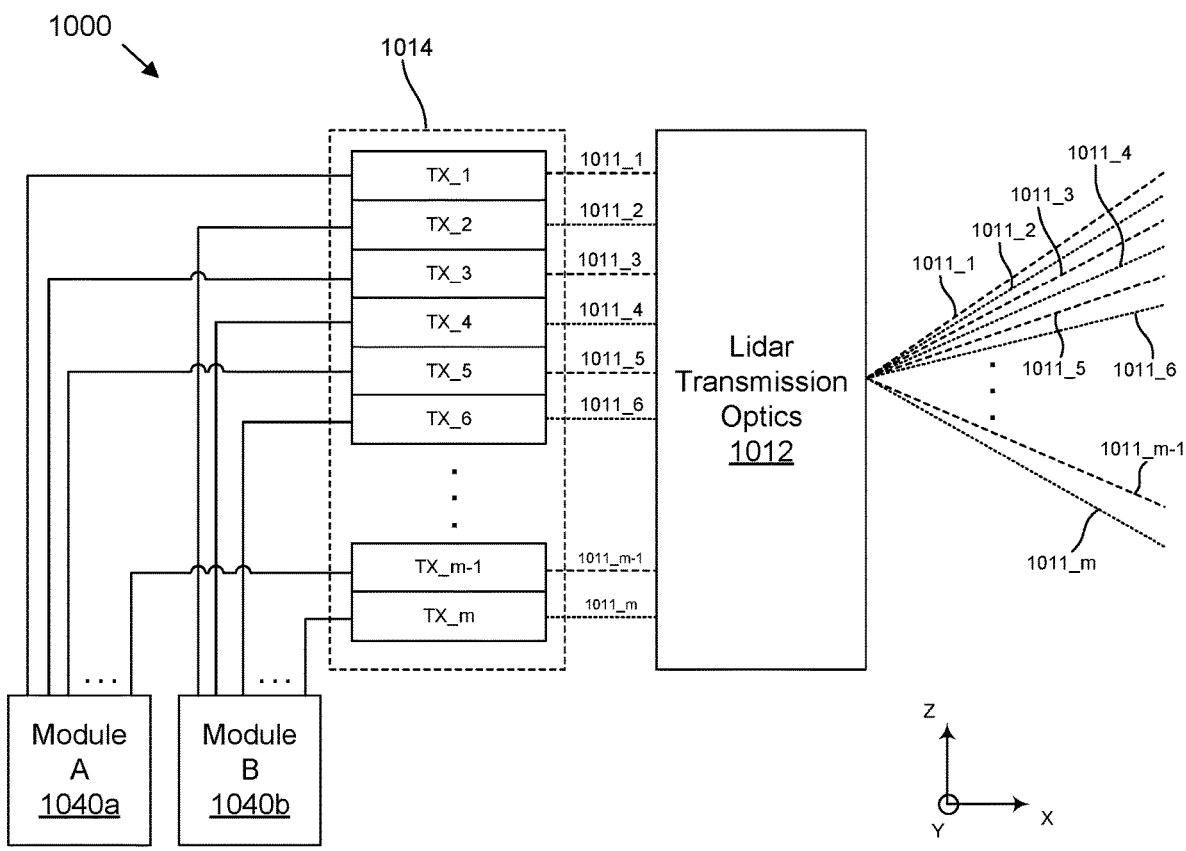

FIGS. 10A-B are block diagrams illustrating an example fault-tolerant lidar which includes light beams generated by the lidar, in accordance with embodiments. With reference to earlier figures, FIGS. 10A-B may be a variation of the illustration of FIGS. 6A-B.

Lidar 1000 illustrated in FIGS. 10A-B may have a rotatable housing 1010 and a base 1001. Referring back to FIG. 9, the rotatable housing 1010 may correspond to the rotatable housing 910 of FIG. 9 and the base 1001 may refer to the components of the lidar that are not disposed within the rotatable housing 1010, such as the base controllers 928a and 928b, motor controllers 930a and 930b, and/or the actuator 926 of FIG. 9. As illustrated in FIG. 10A, the rotatable housing 1010 may be rotated, turned, spun, or pivoted about a rotation axis 1005 by, for example, the actuator 926 of FIG. 9. The lidar 1000 is configured to emit a plurality of beams of light 1011. The optical components of the lidar 1000—such as lenses, mirrors, collimators, and the like—may cause the plurality of beams 1011 to be emitted from the lidar 1000 in accordance with a beam distribution pattern such as the one illustrated in FIGS. 10A-B. In particular, the plurality of beams 1011 may be distributed along an axis (e.g., Z-axis or vertical axis). The number of beams generated by the lidar 1000 and the beam distribution pattern may define specifications of the lidar 1000 such as angular resolution, vertical field of view, etc. The lidar 1000 may have any number of beams (m number of beams). For example, the lidar 1000 may have 16, 32, 64, 128, or 256 beams or channels.

The plurality of beams may include a first beam 1011_1, a second beam 1011_2, a third beam 1011_3, a fourth beam 1011_4, etc. As illustrated in FIGS. 10A-B, the first beam 1011_1 may have the highest elevation angle within the distribution pattern and the last beam 1011_m may have the lowest elevation angle. According to embodiments, the lidar 1000 may be configured such that adjacent beams within the plurality of beams are controlled by different modules and/or powered by different power domains. For instance, odd channels of the plurality of beams 1011 (e.g., 1011_1, 1011_3, 1011_5, etc.) may be controlled by the first module 940a (or may be a part of the first module 940a) and even channels of the plurality of beams 1011 (e.g., 1011_2, 1011_4, 1011_6, etc.) may be controlled by the second module 940b (or may be a part of the second module 940b). In addition, the odd channels of the plurality of beams 1011 may be powered by the first power domain 945a (e.g., via first power supply 934a) and the even channels of the plurality of beams 1011 may be powered by the second power domain 945b (e.g., via second power supply 934b). Referring back to FIG. 9, the first set of light sources 914a may generate light beams that correspond to the odd channels and the second set of light sources 914b may generate light beams that correspond to the even channels, or vice versa. In other words, the plurality of light beams generated by the lidar 1000 may be interleaved.

In more detail, referring to FIG. 10B, the lidar 1000 may include a plurality of light sources 1014 and a set of lidar transmission optics 1012. The light sources 1014 may comprise the light sources 914a and 914b of FIG. 9 and the lidar transmission optics 1012 may correspond to or may be a part of the lidar optics 912 of FIG. 9. The light sources 1014 generate light beams that are shaped and collimated by the lidar transmission optics 1012 into a distribution pattern to form the plurality of light beams 1011.

As illustrated in FIG. 10B, the light sources 1014 may include a first light source TX_1 that emits light that, after being shaped and collimated by the lidar transmission optics 1012, is emitted from the lidar 1000 as beam 1011_1. Similarly, the light sources 1014 may include a second light source TX_2 that emits light that, after being shaped and collimated by the lidar transmission optics 1012, is emitted from the lidar 1000 as beam 1011_2. And so on. According to embodiments, the first set of light sources 914a may comprise light sources TX_1, TX_3, TX_5. . . . , and TX_m−1, with m being the total number of light beams (or channels) emitted by the lidar 1000. And the second set of light sources 914b may comprise light sources TX_2, TX_4, TX_6, . . . and TX_m. The first set of light sources 914a may be controlled by the components within first module 1040a and powered by a first power domain (e.g., power domain 945a of FIG. 9). And the second set of light sources 914b may be controlled by components within the second module 1040b and powered by a second power domain (e.g., power domain 945b of FIG. 9).

Among other benefits, by interleaving the channels or light beams of emitted by the lidar 1000 in the manner described herein, fault-tolerance of the lidar 1000 is improved. In particular, when the first module 1040a experiences a failure, the light beams emitted by the second set of light sources may continue to be generated by the lidar 1000 and used to generate point cloud data. By interleaving the channels, the lidar 1000 maintains substantially the same vertical field of view when operating in a failsafe mode (e.g., when one of the modules 1040a and 1040b is non-operational) as compared with when the lidar 1000 is operating normally.

Figure 11A:
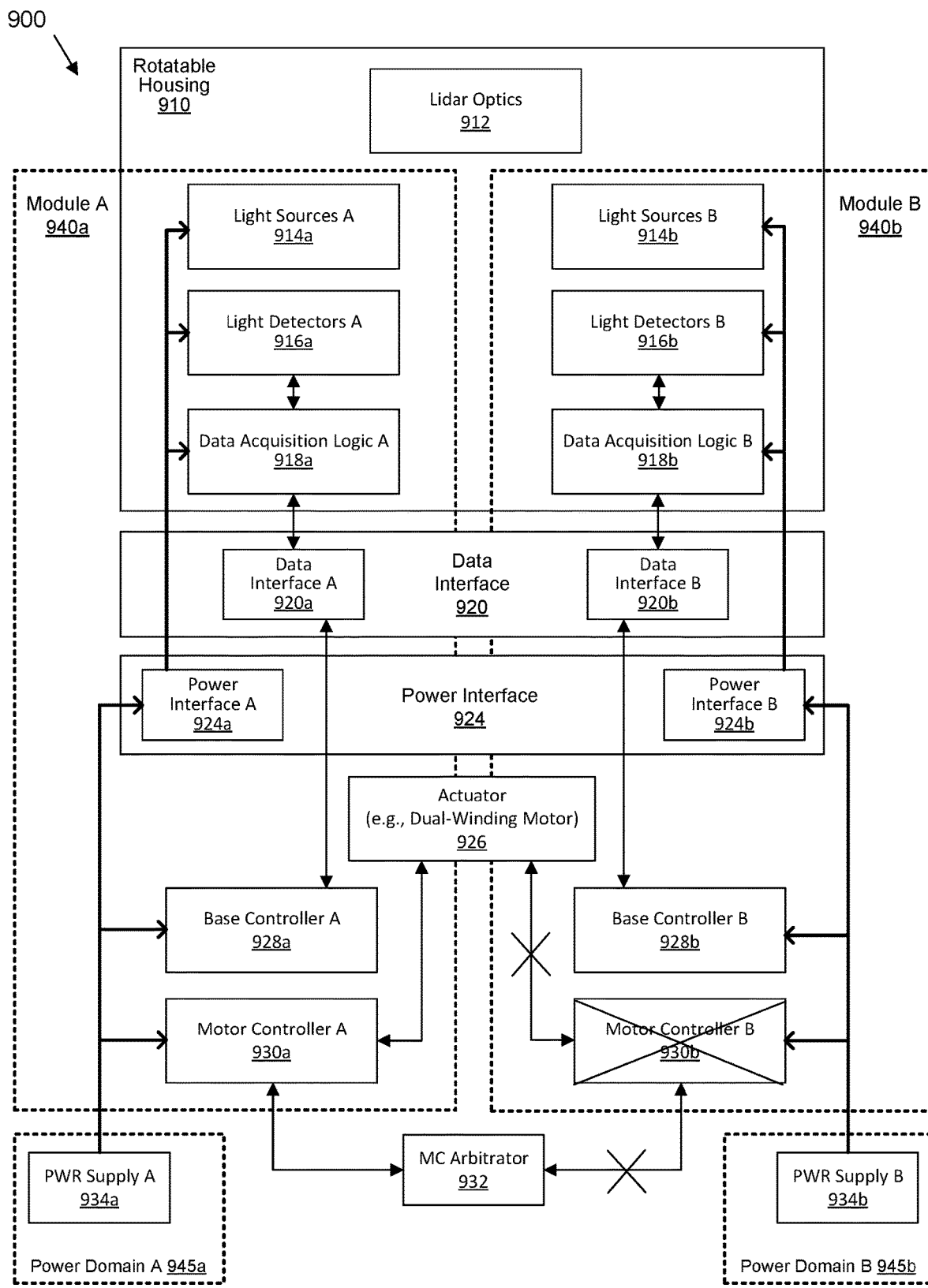
FIGS. 11A-E are block diagrams illustrating an example fault-tolerant lidar operating under conditions in which one or more components of the lidar have failed or faulted, in accordance with embodiments.
Figure 11B:
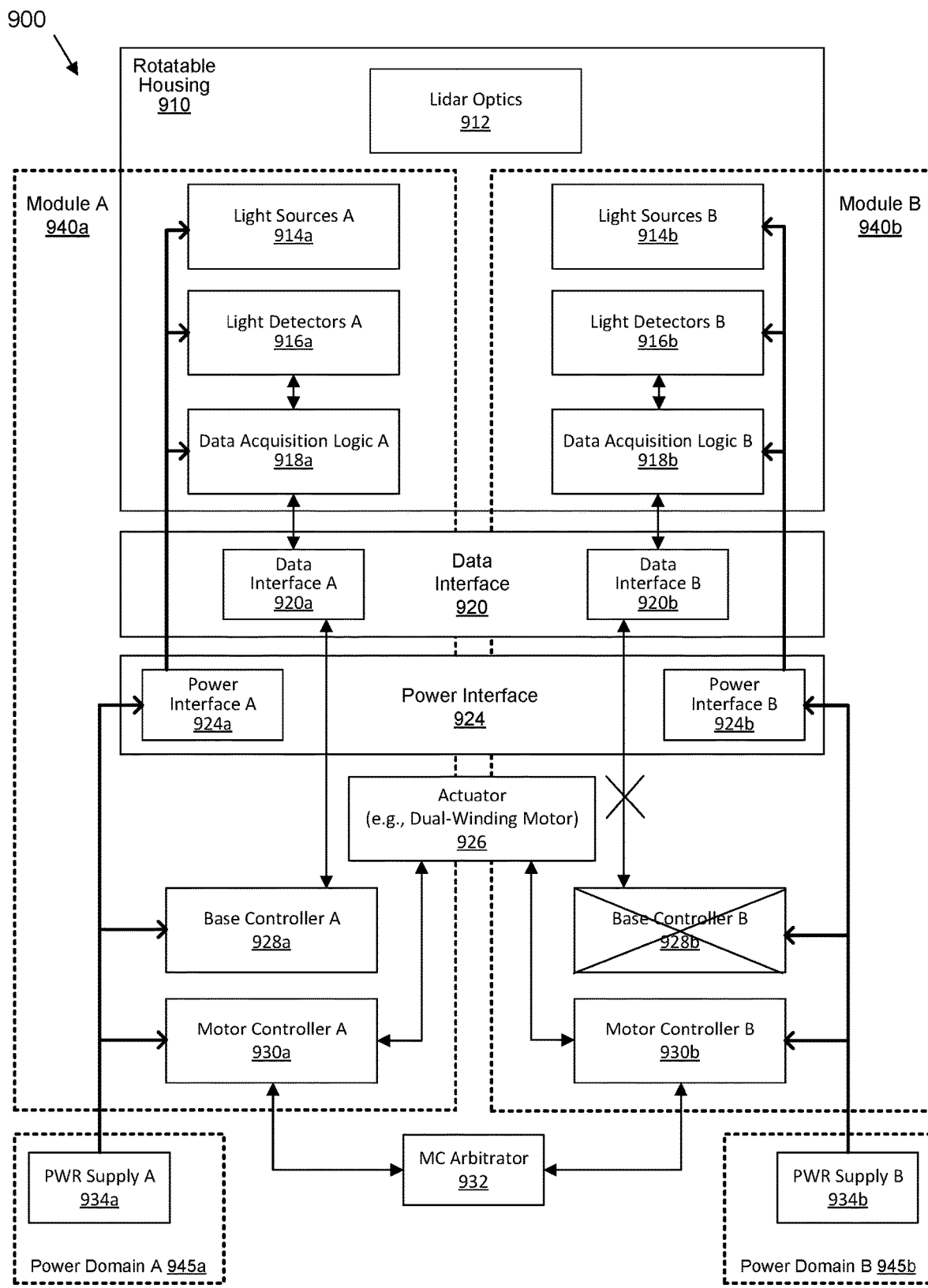
Figure 11C:
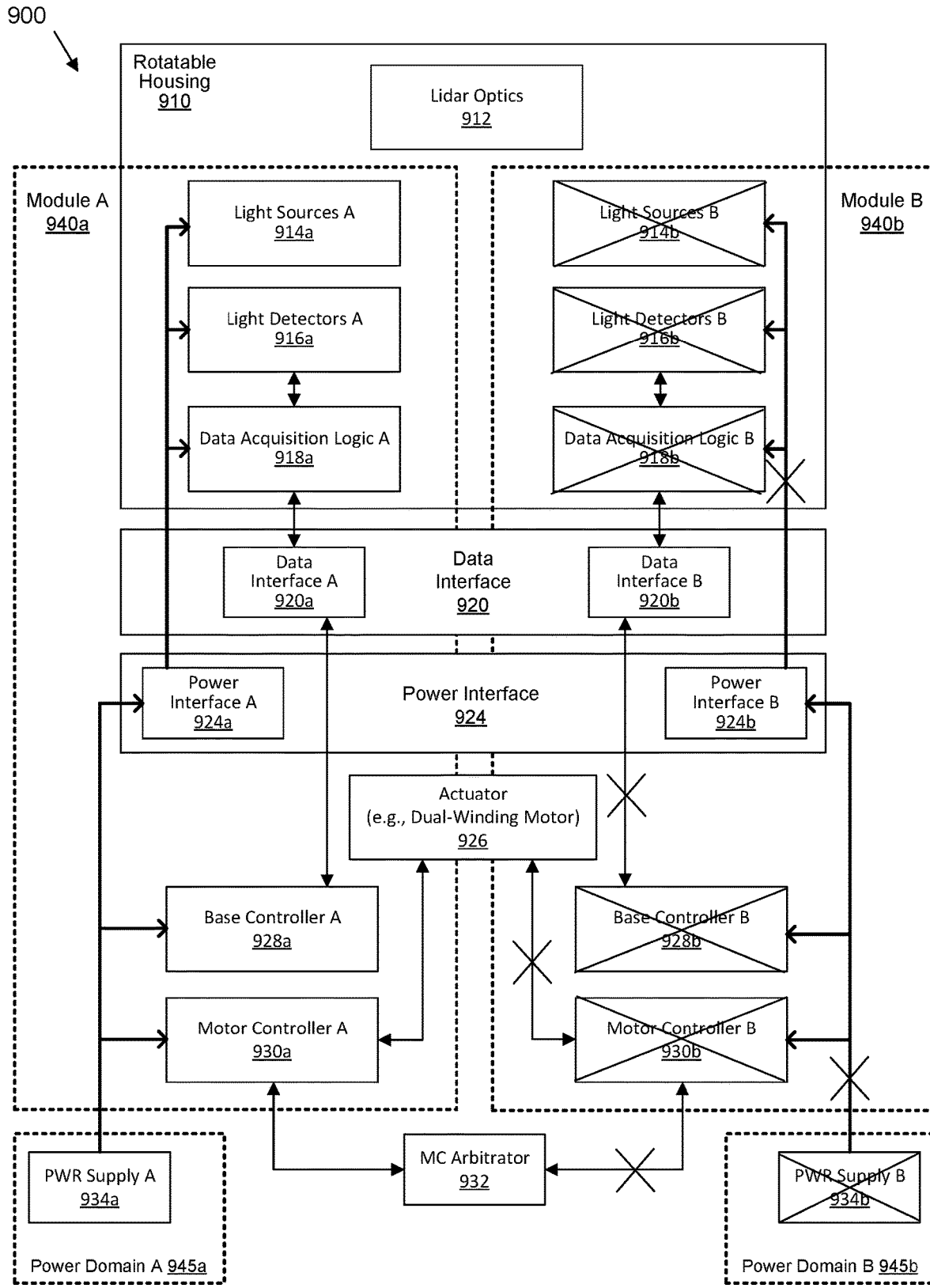
Figure 11D:
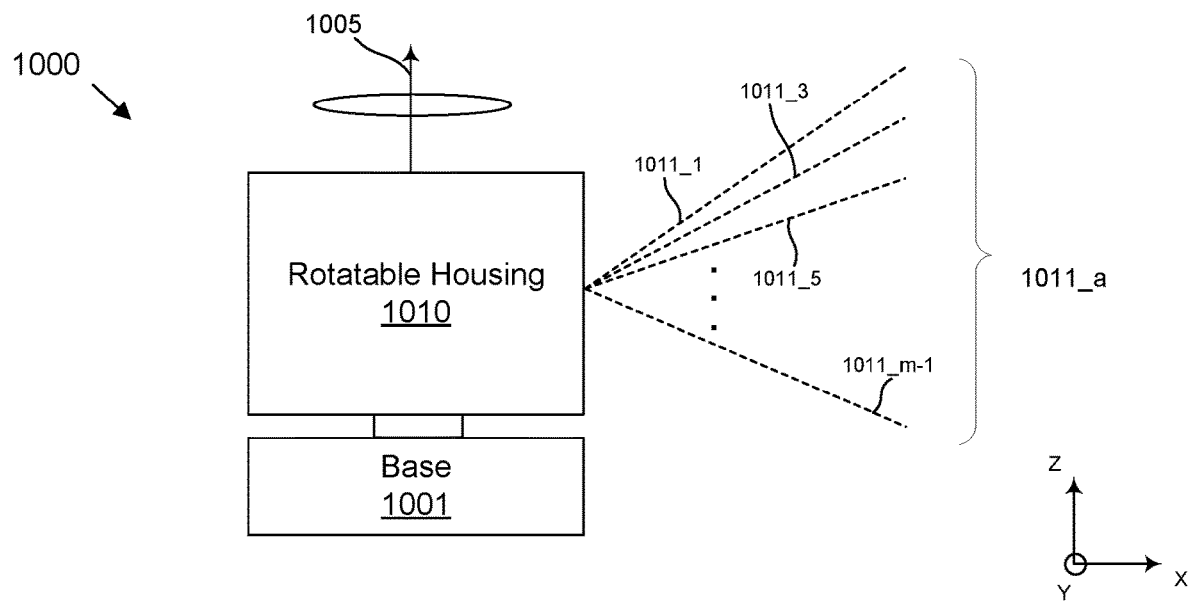
Figure 11E:
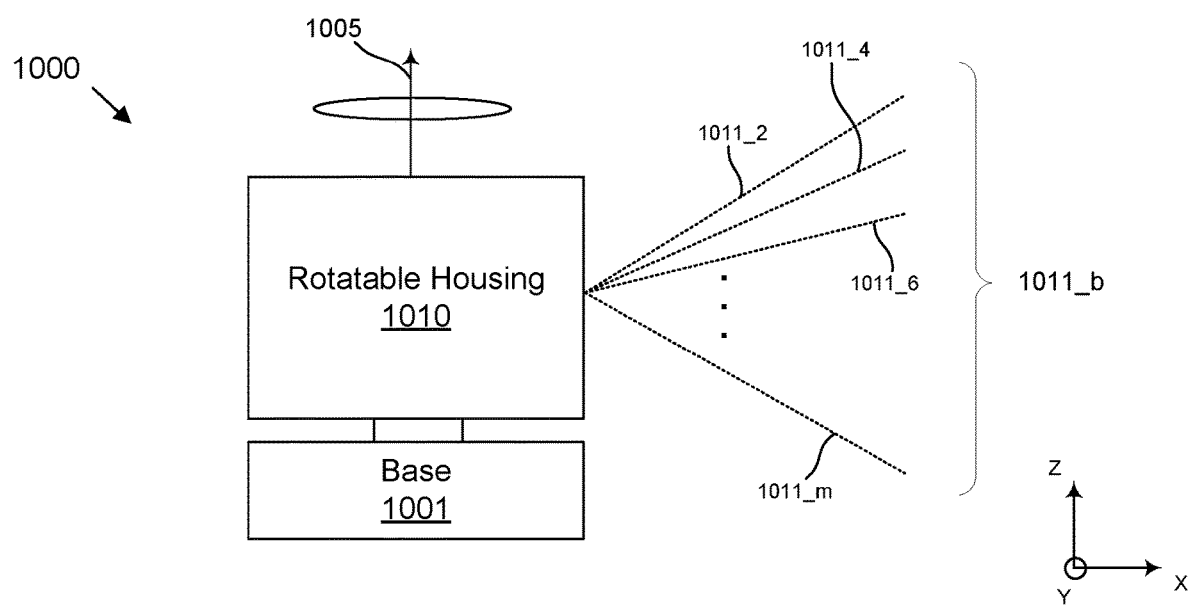

FIGS. 11A-E are block diagrams illustrating an example fault-tolerant lidar operating under conditions in which one or more components of the lidar have failed or faulted, in accordance with embodiments. In particular, FIGS. 11A-C illustrate specific failure or fault scenarios associated with the fault-tolerant lidar 900 of FIG. 9 and FIGS. 11D-E illustrate effective lidar distribution patterns while the lidar 1000 of FIG. 10 is operating in a failsafe mode.

FIG. 11A illustrates a scenario of the fault-tolerant lidar 900 of FIG. 9 in which the second motor controller 930*b* of the second module 940*b* has failed or faulted in a manner that prevents the second motor controller 930*b* from properly issuing control signals to control the actuator 926. Under such a scenario, lidar 900 may continue normal operations (e.g., not enter into failsafe mode) because the first motor controller 930 is able to control the actuator 926 by itself and the other components of the second module 940*b* such as the second set of light sources, the second set of light detectors, etc., may continue to operate normally. In other words, in the event of a motor controller failure or fault, the lidar 900 may continue to operate normally and continue to generate lidar point cloud data in a normal manner.

FIG. 11B illustrates a scenario of the fault-tolerant lidar 900 of FIG. 9 in which the second base controller 928*b* (or a related component) has failed or faulted in a manner that prevents the base controller 928*b* from performing one or more functions such as generating control signals to control the second set of light sources 914*b*, receiving data generated by the data acquisition logic 918*b*, generating output data (e.g., point cloud data, etc.), and the like. Under such a scenario, lidar 900 may continue to operate to generate point cloud data. The lidar 900 may enter into failsafe mode operations in which the point cloud data outputted by the lidar 900 is only generated as a result of the components of the first module 940*a* continuing to operate.

FIG. 11C illustrates a scenario of the fault-tolerant lidar 900 of FIG. 9 in which the second power supply 934*b* that supplies power to components within the second module 940*b* has failed or faulted in a manner that prevents the second power supply 934*b* from supplying power of sufficient voltage or current to the components of the second module 940*b*. Under such a scenario, the lidar 900 may continue to operate to generate point cloud data. The lidar 900 may enter into failsafe mode operations in which the point cloud data outputted by the lidar 900 is only generated as a result of the components of the first module 940*a* continuing to operate.

It should be appreciated that, although FIGS. 11A-C illustrate failsafe mode operations of the lidar 900 in response to failures or faults associated with components of the second module 940*b*, the lidar 900 may also continue to operate in response to failures or faults associated with components of the first module 940*a*.

FIG. 11D illustrates an effective lidar beam distribution pattern while the lidar 1000 is operating the failsafe mode. In particular, in the scenario illustrated in FIG. 11D, one or more components of the second module 940*b* may be inoperative or have faulted, resulting in the lidar beam distribution pattern 1011_a illustrated in FIG. 11D. More specifically, in the lidar distribution pattern 1011_a, only odd channels of the lidar 1000 (e.g., those generated and/or detected by the first module 940*a*) are effectively operative.

FIG. 11E illustrates another effective lidar beam distribution pattern while the lidar 1000 is operating the failsafe mode. In contrast with FIG. 11D, in the scenario illustrated in FIG. 11E, one or more components of the first module 940*a* may be inoperative or have faulted, resulting in the lidar beam distribution pattern 1011_b illustrated in FIG. 11E. More specifically, in the lidar distribution pattern 1011_b, only even channels of the lidar 1000 (e.g., those generated and/or detected by the second module 940*b*) are effectively operative.

Figure 12:
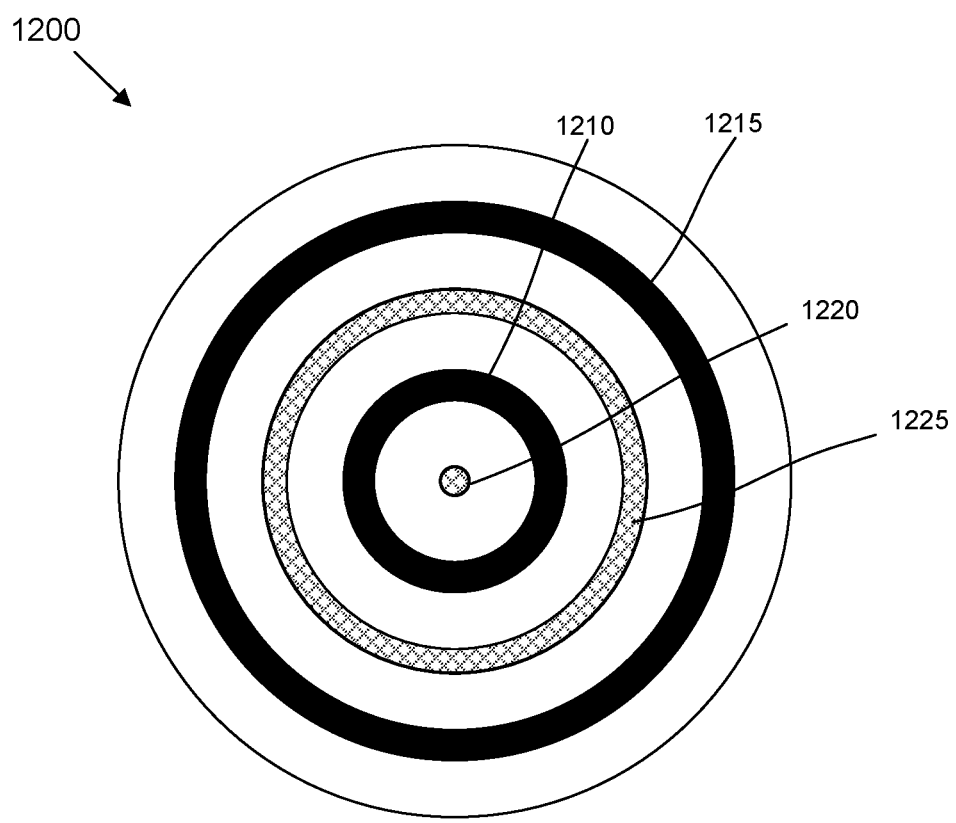
FIG. 12 is an example of a portion of an interface between components disposed within a rotatable housing of a fault-tolerant lidar and other components within the base of the fault-tolerant lidar, in accordance with embodiments.

FIG. 12 is an example of a portion of an interface between components disposed within a rotatable housing of a fault-tolerant lidar and other components within the base of the fault-tolerant lidar, in accordance with embodiments. The interface 1200 may be a portion of the data interface 920 and the power interface 924 of FIG. 9. The interface 1200 may comprise a first inductive power transfer coil 1210 (e.g., configured to convey power to components of the first module 940*a* that are disposed within the rotatable housing 910) and a second inductive power transfer coil 1215 (e.g., configured to convey power to components of the second module 940*b* that are disposed within the rotatable housing 910). The first inductive power transfer coil 1210 and the second power transfer coil 1215 may be concentrically arranged on the interface 1200 and the first inductive power transfer coil 1210 may have a smaller radius than the second inductive power transfer coil. The interface 1200 may further comprise electric insulation between the first and second inductive power transfer coils 1210 and 1215.

The interface 1200 may further comprise a first light pipe 1220 (e.g., configured to transfer data to and/or from components of the first module 940*a* that are disposed within the rotatable housing 910) and a second light pipe 1225 (e.g., configured to transfer data to and/or from components of the second module 940*b* that are disposed within the rotatable housing 910). The first and second light pipes 1220 and 1225 may be concentrically arranged on the interface 1200.

Figure 13:
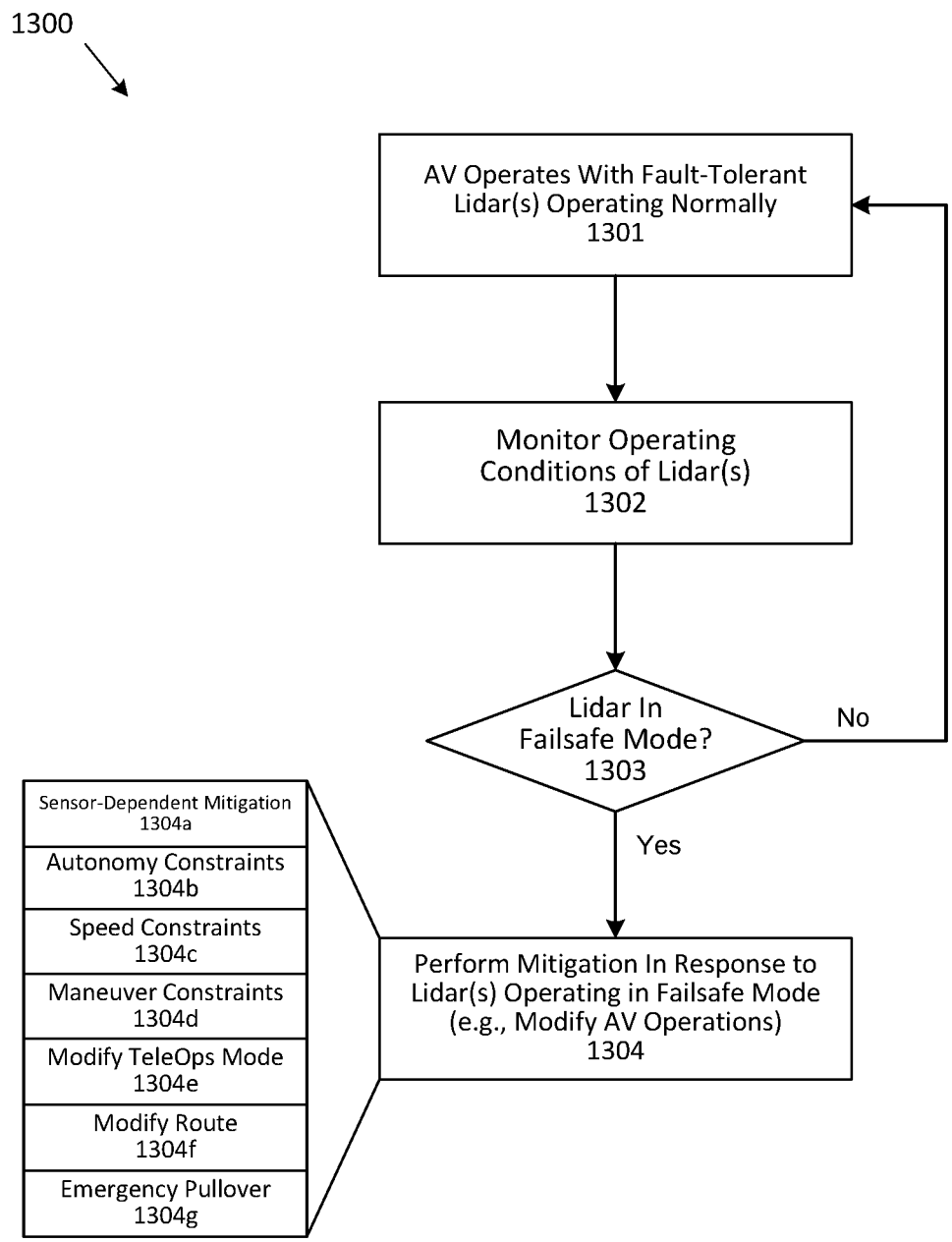
FIG. 13 is a flowchart diagram illustrating an example method of operating an autonomous vehicle equipped with one or more fault-tolerant lidars, in accordance with embodiments.

FIG. 13 is a flowchart diagram illustrating an example method of operating an autonomous vehicle equipped with one or more fault-tolerant lidars, in accordance with embodiments.

The method 1300 may begin at step 1301. At this step, the autonomous vehicle may operate in an autonomous mode. A computing system of the autonomous vehicle that implements autonomous functionalities may continuously receive data from sensors onboard the vehicle such as lidars, radars, cameras, thermal imaging sensors, ultrasonic sensors, and the like, to generate autonomy commands for controlling the vehicle. For instance, the computing system may receive point cloud data generated by lidars onboard the vehicle, the point cloud data being associated with the environment of surrounding the vehicle. According to embodiments, the lidars, such as one or more long-range lidars and one or more short-range lidars, may be fault-tolerant lidars that are capable and/or configurable to operate in a failsafe mode.

At step 1302, the computer system and/or other systems onboard the autonomous vehicle may monitor the operating conditions of the lidars onboard the vehicle. For instance, the computer system and/or other systems onboard the autonomous vehicle may continuously monitor point cloud data and/or status data from the lidars to determine whether any of the lidars has entered into the failsafe mode. In one example, the computer system may continuously analyze the point cloud data from a lidar to determine whether it has entered failsafe mode. For example, if the point cloud data points reflects that the lidar is only generating data for half the data points (e.g., for a two-module fault-tolerant lidar indicating that one of the two modules is non-operational), the computer system may make the determination that the lidar has entered failsafe mode operations. In addition, or as an alternative, the lidar may generate status signals or data to inform the computer system onboard the autonomous vehicle when it has entered failsafe mode operations. If, at step 1303, none of the lidars onboard the autonomous vehicle has been determined to be operating in failsafe mode, the process 1300 may return to 1301 and 1302.

If, on the other hand, it is determined at step 1303 that one or more of the lidars are operating in failsafe mode, the autonomous vehicle (e.g., the computing system implementing autonomy functionalities on the vehicle and/or other systems or components on the vehicle) may perform, at step 1304, one or more mitigation steps in response to detecting that one or more lidars of the vehicle are operating in failsafe mode.

According to one aspect 1304a, the mitigation performed in response to a detection that a lidar of the autonomous vehicle is operating in failsafe mode may be dependent on the particular lidar that is operating in the failsafe mode. The autonomous vehicle may be equipped with a plurality of lidars including, for example, a long-range lidar and a plurality of short-range lidars. For instance, the autonomous vehicle may be equipped with four short-range lidars each providing lidar coverage for a respective side of the autonomous vehicle (e.g., front, right, left, and rear). Each of the lidars equipped on the autonomous vehicle may be configured as described herein (e.g., capable of operating in a failsafe mode). The mitigation performed at step 1304 may be dependent upon which of the lidars on the autonomous vehicle entered failsafe mode. In other words, the mitigation performed at step 1304 in response to the long-range lidar of the autonomous vehicle operating in the failsafe mode may be different compared to the mitigation performed at step 1304 in response to a short-range lidar of the autonomous vehicle operating in the failsafe mode. In general, the vehicle may be constrained in its operations that depend on lidar data generated by the particular sensor that is operating in failsafe mode. For example, in the event that the long-range lidar of the vehicle is operating in failsafe mode, the speed of the vehicle may be restricted since long-range lidar provides the autonomy system of the vehicle data pertaining to objects and scenes at a distance from the vehicle. In contrast, in the event that the right-facing short-range lidar is operating in failsafe mode, the vehicle may be constrained or prevented from, for example, autonomously performing low-speed pullover maneuvers to the right side of the road.

According to another aspect 1304b, one or more aspects or constraints with respect to the vehicle's autonomy operations (e.g., autonomy constraints) may be modified or imposed. And the autonomy commands generated by the computing system to control the vehicle, going forward, may reflect the newly imposed constraints or the modified constraints on the autonomous operations of the vehicle. For instance, a speed constraint 1304b at which the vehicle may drive under the control of the autonomy system may be imposed or may be reduced in comparison to when the vehicle is operating under normal conditions. As another example, autonomy maneuver constraints 1304c may be imposed on the vehicle may prevent the vehicle from autonomously performing certain maneuvers that may require point cloud data from the degraded lidar that is operating in failsafe mode. For instance, in response to the right-facing short-range lidar is operating in failsafe mode, autonomy constraints 1304c may be imposed that prevent the vehicle from autonomously performing pullover maneuvers to the right side of the road, from autonomously performing right-hand turns that cross a pedestrian crosswalk, and the like. Instead, the vehicle may be re-routed to avoid routes that require such maneuvers and/or assisted by teleoperations in performing these restricted maneuvers, as described in further detail below.

According to yet another aspect 1304d, the vehicle's modes of operation with respect to teleoperations may be modified. According to embodiments, the vehicle may comprise a teleoperations interface that enables, by for example communicating with one or more teleoperations servers, a remote teleoperations operator to monitor the vehicle as it operates autonomously and/or to take control of the vehicle (e.g., via inputs provided to a teleoperations operator interface system) when needed. In particular, the remote teleoperations operator may view one or more video streams generated using data captured by cameras onboard the vehicle to monitor the vehicle as it operates autonomously. The operator may issue commands to the vehicle to, for example, perform an emergency stop, to avoid collisions or other issues. The operator may also take control of the vehicle when the autonomy system experiences issues or when the autonomy system is unable to successfully or safely navigate the environment of the vehicle.

In response to a determination that one or more lidars of the vehicle is operating in the failsafe mode, the vehicle may enter into a mode of operation in which active teleoperations control is required for the vehicle. As such, the vehicle may perform a series of steps such as performing a safe stop and waiting for a teleoperations operator to assume remote control of the vehicle. In addition, or as an alternative, the teleoperations server may perform operations to cause the teleoperations monitoring of the vehicle to be elevated or enhanced. For example, a teleoperations operator may concurrently monitor two, three, four, or more autonomous vehicles of an AV fleet when such vehicles are operating normally. In contrast, in response to a determination that one or more lidars of the vehicle are operating in the failsafe mode, the vehicle may communicate with the teleoperations server to require 1-to-1 monitoring of the vehicle by dedicated remote teleoperations operator. Still further, the vehicle may be constrained from autonomously performing certain specific maneuvers under specific scene or traffic conditions autonomously and may be allowed to perform such maneuvers only under active control by a teleoperations operator.

According to a further aspect 1304f, the route of the autonomous vehicle may be dynamically modified in response to a determination that one or more of the lidars of the vehicle is operating in a failsafe mode. This aspect 1304f may be associated with and/or based on, for example, the autonomy constraints 1304b. More specifically, based on the autonomy constraints 1304b imposed on the vehicle's autonomous operations, the vehicle may be re-routed. In one example, autonomy constraints 1304b may be imposed while the autonomous vehicle is on a delivery route to deliver goods and/or services as part of an AV fleet for providing such services. The autonomous vehicle and/or a backend vehicle routing service may determine that the imposed autonomy constraints 1304b do not allow the vehicle to complete its delivery route. In response, the vehicle may be routed to return to the service depot that services the AV fleet. In another example, if the autonomy constraints 1304b includes a speed limit constraint, the vehicle may be dynamically re-routed to avoid expressways and/or highways on which vehicle speeds exceed such a speed limit constraint.

According to yet another aspect 1304g, the autonomous vehicle may perform a safe stop and/or an emergency pullover maneuver in response to a determination that one or more of the lidars onboard the vehicle are operating in the failsafe mode.

Although a few aspects of the mitigation performed at step 1304 have been described, the mitigation performed by the autonomous vehicle in response to a lidar operating in the failsafe mode may be multifaceted and may involve any combination of the aspects described above or in combination with other aspects or mitigation techniques without departing from the spirit or the scope of the present disclosure.

Furthermore, although only a few embodiments have been described in this disclosure, it should be understood that the disclosure may be embodied in many other specific forms without departing from the spirit or the scope of the present disclosure. By way of example, while a long-range rotational lidar unit has been described as having redundant electronics and/or software modules, the use of redundant electronics and/or software is not limited to long-range lidar units or limited to rotational lidar units. Redundant electronics and/or software modules may generally be implemented with respect to any suitable lidar sensor or system.

An autonomous vehicle has generally been described as a land vehicle, or a vehicle that is arranged to be propelled or conveyed on land. It should be appreciated that in some embodiments, an autonomous vehicle may be configured for water travel, hover travel, and or/air travel without departing from the spirit or the scope of the present disclosure. In general, an autonomous vehicle may be any suitable transport apparatus that may operate in an unmanned, driverless, self-driving, self-directed, and/or computer-controlled manner.

The embodiments may be implemented as hardware, firmware, and/or software logic embodied in a tangible, i.e., non-transitory, medium that, when executed, is operable to perform the various methods and processes described above. That is, the logic may be embodied as physical arrangements, modules, or components. For example, the systems of an autonomous vehicle, as described above with respect to FIG. 3, may include hardware, firmware, and/or software embodied on a tangible medium. A tangible medium may be substantially any computer-readable medium that is capable of storing logic or computer program code which may be executed, e.g., by a processor or an overall computing system, to perform methods and functions associated with the embodiments. Such computer-readable mediums may include, but are not limited to including, physical storage and/or memory devices. Executable logic may include, but is not limited to including, code devices, computer program code, and/or executable computer commands or instructions.

It should be appreciated that a computer-readable medium, or a machine-readable medium, may include transitory embodiments and/or non-transitory embodiments, e.g., signals or signals embodied in carrier waves. That is, a computer-readable medium may be associated with non-transitory tangible media and transitory propagating signals.

The steps associated with the methods of the present disclosure may vary widely. Steps may be added, removed, altered, combined, and reordered without departing from the spirit of the scope of the present disclosure. Therefore, the present examples are to be considered as illustrative and not restrictive, and the examples are not to be limited to the details given herein, but may be modified within the scope of the appended claims.

What is claimed is:

1. A rotational lidar comprising:
  a rotatable housing;
  a plurality of light sources disposed within the rotatable housing;
  a plurality of light detectors disposed within the rotatable housing;
  a dual-winding motor configured to rotate the rotatable housing about an axis;
  two motor controllers each configured to control the dual-winding motor; and
  wherein, in response to a failure associated with one of the two motor controllers, the LiDAR sensor is configured to continue operating with the other one of the two motor controllers controlling the dual-winding motor to rotate the rotatable housing of the LiDAR about the axis.

2. The rotational lidar of claim 1, wherein the rotational lidar is configured to receive power from two separate power domains.

3. The rotational lidar of claim 2, wherein a first set of windings of the dual-winding motor is configured to be energized by one of the two separate power domains and a second set of windings of the dual-winding motor is configured to be energized by the other of the two separate power domains.

4. The rotational lidar of claim 1, further comprising a power interface configured to convey power from the two separate power domains to components disposed within the rotatable housing, including the plurality of light sources and the plurality of light detectors.

5. The rotational lidar of claim 4, wherein the power interface comprises two concentric inductive coils.

6. The rotational lidar of claim 5, wherein one of the two concentric inductive coils is configured to inductively convey power from a first of the two separate power domains to a first set of light sources within the plurality of light sources and a first set of light receivers within the plurality of light receivers; and
  wherein the other of the two concentric inductive coils is configured to inductively convey power from a first of the two separate power domains to a first set of light sources within the plurality of light sources and a first set of light receivers within the plurality of light receivers.

7. The rotational lidar of claim 1, further comprising:
  a data interface configured to transfer data to or from components disposed within the rotatable housing; and
  wherein the data interface comprises a first optical data interface and a second optical data interface.

8. The rotational lidar of claim 7, wherein the first optical data interface and the second optical data interface are concentrically arranged.

9. The rotational lidar of claim 1, further comprising:
  a first set of circuitry communicatively coupled to a first set of light sources of the plurality of light sources disposed within the rotatable housing;
  a second set of circuitry communicatively coupled to a second set of light sources of the plurality of light sources disposed within the rotatable housing; and
  wherein the first set of light sources and the second set of light sources are separately controlled by the first set of circuitry and the second set of circuitry, respectively.

10. The rotational lidar of claim 9, further comprising:
  a set of light transmission optics components disposed within the rotatable housing; and
  wherein light emitted by the first set of light sources and light emitted by the second set of light sources share the set of light transmission optics components.

* * * * *